United States Patent
Silvestro et al.

(10) Patent No.: US 10,354,278 B2
(45) Date of Patent: Jul. 16, 2019

(54) SYSTEMS AND METHODS FOR PROVIDING GEOGRAPHICALLY-BASED PROMOTIONS

(71) Applicant: Mad Reach LLC, Sandy, UT (US)

(72) Inventors: Christopher Silvestro, Sandy, UT (US); Gregory Charles Chotkowski, Nantucket, MA (US)

(73) Assignee: MYSTIC MEDIA LLC, Sandy, UT (US)

( * ) Notice: Subject to any disclaimer, the term of this patent is extended or adjusted under 35 U.S.C. 154(b) by 849 days.

(21) Appl. No.: 14/505,371

(22) Filed: Oct. 2, 2014

(65) Prior Publication Data
US 2016/0098755 A1   Apr. 7, 2016

(51) Int. Cl.
*G06Q 30/00*   (2012.01)
*G06Q 30/02*   (2012.01)

(52) U.S. Cl.
CPC ..... *G06Q 30/0261* (2013.01); *G06Q 30/0251* (2013.01); *G06Q 30/0258* (2013.01); *G06Q 30/0267* (2013.01)

(58) Field of Classification Search
CPC .................................................. G06Q 30/0261
USPC .......................................................... 705/14
See application file for complete search history.

(56) References Cited

U.S. PATENT DOCUMENTS

| | | | |
|---|---|---|---|
| 7,769,633 B2 | 8/2010 | Jokinen et al. | |
| 8,015,064 B2 | 9/2011 | Crolley | |
| 8,126,478 B2 | 2/2012 | Northway et al. | |
| 8,311,845 B2 | 11/2012 | Vengroff et al. | |
| 8,467,807 B1 | 6/2013 | Dalit et al. | |
| 8,595,070 B1 | 11/2013 | Barnes et al. | |
| 8,620,285 B2 | 12/2013 | Ramer et al. | |
| 8,688,671 B2 | 4/2014 | Ramer et al. | |
| 8,768,765 B1* | 7/2014 | Kato ...................... | G06Q 30/02 705/14.4 |
| 2002/0194067 A1 | 12/2002 | Wechsler et al. | |
| 2003/0004802 A1 | 1/2003 | Callegari | |
| 2007/0185768 A1* | 8/2007 | Vengroff ................ | G06Q 30/02 705/14.64 |

(Continued)

FOREIGN PATENT DOCUMENTS

| | | |
|---|---|---|
| WO | WO 2001/061559 A1 | 8/2001 |
| WO | WO 2007/117811 A2 | 10/2007 |
| WO | WO 2007/117811 A3 | 10/2007 |

*Primary Examiner* — Matthew L Hamilton
(74) *Attorney, Agent, or Firm* — Duren IP; Todd E. Zenger

(57) ABSTRACT

Systems and methods for providing promotional materials to potential customers are described. In some cases, the described methods include obtaining GPS coordinates of a merchant's location. In some cases, the methods further include providing a map showing the locations of customers in a promotion area, wherein a merchant is able to resize the promotion area to increase or decrease how many customers are in the promotion area. In some cases, the merchant further produces a text or other electronic promotion, optionally sets a time period in which such promotion is effective, and provides the promotion to customers within the promotion area. In some cases, as customers enter the merchant's location with their electronic devices that received the promotion, and during the promotion's effective period, the described systems match such devices' GPS coordinates with the GPS coordinates of the merchant's location to register conversions on the promotion. Other implementations are described.

10 Claims, 26 Drawing Sheets

(56) References Cited

U.S. PATENT DOCUMENTS

| | | |
|---|---|---|
| 2007/0192183 A1 | 8/2007 | Monaco et al. |
| 2008/0026716 A1 | 1/2008 | Billmaier et al. |
| 2008/0154714 A1 | 6/2008 | Liu et al. |
| 2008/0186165 A1* | 8/2008 | Bertagna ............ G08B 21/0227 340/539.13 |
| 2008/0300970 A1 | 12/2008 | Scheibe |
| 2009/0287558 A1 | 11/2009 | Seth et al. |
| 2009/0307067 A1 | 12/2009 | Obermeyer |
| 2010/0318407 A1* | 12/2010 | Leff ..................... G06Q 10/107 705/14.1 |
| 2010/0324994 A1* | 12/2010 | Crawford .......... G06F 17/30867 705/14.58 |
| 2011/0010229 A1 | 1/2011 | Ow |
| 2011/0106613 A1 | 5/2011 | Felt et al. |
| 2011/0218930 A1 | 9/2011 | Black |
| 2011/0223895 A1* | 9/2011 | Wagda .................... H04W 4/20 455/414.2 |
| 2011/0238476 A1 | 9/2011 | Carr et al. |
| 2012/0010938 A1* | 1/2012 | Standley ................ G06Q 30/02 705/14.36 |
| 2012/0054001 A1* | 3/2012 | Zivkovic ............ G06Q 30/0207 705/14.1 |
| 2012/0084137 A1* | 4/2012 | Shimogori ............ G06Q 30/02 705/14.39 |
| 2012/0158474 A1 | 6/2012 | Fahner et al. |
| 2012/0197720 A1* | 8/2012 | Bezancon .......... G06Q 30/0255 705/14.53 |
| 2012/0209686 A1 | 8/2012 | Horowitz et al. |
| 2012/0239483 A1 | 9/2012 | Yankovich |
| 2013/0006770 A1 | 1/2013 | Vengroff et al. |
| 2013/0054335 A1 | 2/2013 | Kjelsbak |
| 2013/0103480 A1 | 4/2013 | Lechner et al. |
| 2013/0166386 A1* | 6/2013 | Simmons ........... G06Q 30/0261 705/14.58 |
| 2013/0246302 A1 | 9/2013 | Black |
| 2013/0275221 A1* | 10/2013 | Zeto, III ............ G06Q 30/0261 705/14.58 |
| 2013/0290101 A1 | 10/2013 | Arini et al. |
| 2014/0040007 A1* | 2/2014 | Relyea, Jr. ......... G06Q 30/0242 705/14.41 |
| 2014/0155094 A1* | 6/2014 | Zises ..................... H04W 4/021 455/456.3 |
| 2014/0188615 A1* | 7/2014 | Badenhop .......... G06Q 30/0267 705/14.58 |
| 2014/0257991 A1* | 9/2014 | Christensen ....... G06Q 30/0241 705/14.66 |
| 2015/0011237 A1* | 1/2015 | Obermeyer ........... G01S 5/0263 455/456.1 |
| 2015/0031388 A1* | 1/2015 | Chatterjee ............. H04W 4/021 455/456.1 |
| 2015/0088624 A1* | 3/2015 | Frederick ........... G06Q 20/3224 705/14.12 |
| 2015/0149542 A1* | 5/2015 | Jain ........................ H04L 51/32 709/204 |
| 2015/0186941 A1* | 7/2015 | Anthony ............ G06Q 30/0242 705/14.41 |
| 2015/0206087 A1* | 7/2015 | Tavares ............ G06Q 10/06393 705/7.34 |
| 2016/0085773 A1* | 3/2016 | Chang ..................... G06F 16/29 715/753 |
| 2016/0150367 A1* | 5/2016 | Anand .................. H04W 4/021 455/456.3 |
| 2016/0169696 A1* | 6/2016 | Butts .................. G01C 21/3476 701/438 |
| 2016/0253707 A1* | 9/2016 | Momin .............. G06Q 30/0266 |
| 2017/0078840 A1* | 3/2017 | Saurav .................. H04W 4/021 |
| 2017/0195842 A1* | 7/2017 | Brady, Jr. ............. H04W 4/023 |

* cited by examiner

Merchant Registration

Login with: [f] [g+]

OR

Merchant details
*denotes required fields

Email*: [          ]
Password*: [          ]
First name*: [          ]
Last name*: [          ]
Address*: [          ]
City*: [          ]
State*: [--select--  v]
Phone*: [          ]
Zip*: [          ]
Promo code: [    ] Ex.1111

[SAVE] [CANCEL]

Create Coupon

Coupon Details
*denotes required field

Location:*  Hamburger Shack    Free Food
                                Huge Burgers Coupon title:*  Free Food Media text:  Huge Burgers Number of eligible customers:  10

Terms and conditions:

SAVE  CANCEL

*FIG. 4F*

Performance Report

Search coupon performance

Filter

Dates from [ ] to [ ]

Title keyword(s) [ ]

[SUBMIT] [CLEAR FILTER]

| SR NO. | Coupon title | Location | Sent date/time | Number received | Walk-ins |
|---|---|---|---|---|---|
| 1 | Free | 0 | 07-02-2014 1:44PM | 1 | 0 |

*FIG. 4K*

Purchase Points

Point details
Number of points you wish
to purchase:  ☐
 Each point: $0.29

[SUBMIT] [CANCEL]

*FIG. 4L*

SYSTEMS AND METHODS FOR PROVIDING GEOGRAPHICALLY-BASED PROMOTIONS

BACKGROUND OF THE INVENTION

1. Field of the Invention

The present invention relates to systems and methods for advertising. In particular, some implementations of the present invention relate to systems and methods for using one or more mobile devices to provide promotional materials to one or more customers, based (at least partially) on the geographic location of such mobile devices.

2. Background and Related Art

In an effort to encourage or otherwise persuade people to buy certain goods or services, or to otherwise take or continue to take some desired action, merchants, service providers, and advertisers regularly send advertisements to potential consumers through such consumers' cell phones and smart phones. While these advertisements can be sent through a variety of methods and in a variety of different formats, in some cases, such advertisements are sent as text messages, e-mails, pop-up ads, pop-under ads, display advertisements, and through a variety of other methods.

Although many methods that are used to advertise to consumers through cell phones and smart phones can be relatively effective for promoting a particular product or service, or to otherwise persuade potential consumers to take a desired action, such methods of advertising are not necessarily without their shortcomings. For example, some methods for advertising via text messaging, spam e-mails, pop-up ads, etc. can actual annoy or repulse a potential consumer, thus deterring the customer from taking the desired action promoted by the advertisement. Moreover, in some cases in which a potential consumer receives a relatively large amount of advertising that is not relevant to (or invited by) the potential consumer, the consumer ignores such advertisements, and can even miss relevant advertisements that the consumer would have wanted to see. In another example, some advertising methods tailor advertisements to particular consumers, based on such consumers' biographical information (e.g., sex, age, race, income level, etc.). In this example, some consumers may feel uncomfortable in knowingly providing such information for advertisement purposes. As a result, some potential consumers may choose to provide inaccurate or misleading biographical information about themselves, which can lead to advertising that is less relevant to the consumer than it could be if such advertising were based on the consumer's accurate biographical information.

Thus, while techniques currently exist that are used to advertise to potential consumers via such consumers' cell phones and smart phones, challenges still exist, including those discussed above. Accordingly, it would be an improvement in the art to augment or even replace current techniques with other techniques.

SUMMARY OF THE INVENTION

The present invention relates to systems and methods for providing promotional materials to customers (which term may be used herein to also refer to potential customers). While the described systems and methods can function in any suitable manner, in some implementations, the described methods include providing one or more customers with a mobile app (or other form of software) that can be downloaded onto (or otherwise installed on) one or more mobile electronic devices (such as a smart phone, cell phone, PDA, tablet, handheld device, and/or any other suitable electronic device) of such customers. While this mobile app can perform any suitable function, in one non-limiting example, the app allows customers to view and/or search for promotions offered by merchants in a desired location. In another non-limiting example, the app allows customers to subscribe to receive promotional texts, e-mails, and/or other forms of promotional materials from (or relating to) desired merchants. In still another non-limiting example, the app provides customers with the ability to share promotions with others through one or more social media sites (and/or in any other suitable manner). In even another non-limiting example, the app comprises (and/or is configured to function with) a calendaring feature (e.g., GOOGLE® calendar and/or any other suitable calendar). In yet another non-limiting example, the app allows the physical locations of mobile devices having the app installed thereon to be tracked, such that merchants can target specific promotions to customers, based (at least partially) on the location of such mobile devices. In this regard, although in some cases, a merchant can track all potential customers in a given area (including customers that have and have not subscribed to that particular merchant), in some other cases, a merchant is able to specifically track customers that have actually subscribed to that merchant.

In some implementations, the described methods further include obtaining the address or other coordinates of one or more locations of a merchant, such as a restaurant, a retail store, a movie theater, and/or any other suitable location that customers can visit in response to receiving promotional materials relating to that merchant and/or goods or services provided at the merchant's location.

In some cases, the methods further include providing a merchant with a map showing the locations of customers in a promotion area (or a geographical area to which the merchant can send electronic promotions to one or more customers via a text message, a mobile app advertisement, an e-mail, a post on one or more social media sites relevant to such customers, a post one or more other websites, and/or through any other suitable method in which such customers can receive or otherwise access such promotions). In some implementations, the merchant is able to resize the promotion area to increase or decrease how many customers are in the promotion area, and to thereby determine how many customers will receive one or more electronic promotions from that merchant. Additionally, as some implementations of the described systems are configured to send (or push) promotions to customers that are subscribed to a particular merchant, in some instances, the described systems are configured to show a particular merchant which customers, of all of the customers in a promotion area, are actually subscribed to that merchant. Moreover, in some implementations, customers are also able to search for promotions that are available in a desired location, provided by a desired merchant, have a certain review, and/or that otherwise fit desired search criteria. Accordingly, in such implementations, the customers can pull promotions on demand.

While promotions can be generated in any suitable manner, in some cases, a merchant is able to create its own promotions. In this regard, a merchant can create such promotions in any suitable manner that allows such promotions to be pushed to and/or pulled by customers, as intended. In some instances, however, merchants are able to use the described systems and methods to create a single advertisement that the system is able to auto-populate as an text message, an e-mail, an in-app notification, a calendar posting, an advertisement on a social media website, an advertisement on a website, and/or as any other suitable form of advertisement.

In some implementations, once the merchant has selected the geographic size of the promotion area; prepared a promotional text message, calendar notification, e-mail, and/or other suitable promotion; and has optionally set a time period in which the promotion can redeemed (or is otherwise effective), the merchant is able to provide that promotion to customers within the promotion area in any suitable manner, including, without limitation, via e-mail, text message, an in-app promotion, a post on a social media site, a post on a website, a calendar notification, etc.). In some implementations, even if a customer is not in the promotion area when a particular promotion is initially sent, such customer can automatically receive that promotion when the customer enters the promotion area during the effective period of the promotion. In even other implementations, a customer can choose (e.g., set the mobile app) to receive promotions from one or more merchants when the promotions are sent, whether or not the customer is in the promotion area.

While the effectiveness of a merchant's promotions can be measured in any suitable manner, in some implementations, a promotion is determined to be effective when a customer having the mobile app on the customer's mobile device enters (or comes within a set distance from) a merchant's location while carrying such mobile device and during the effective period a promotion relating to such merchant's location (e.g., during a set amount of time). Indeed, in some implementations, when a customer's location (e.g., GPS coordinates, longitudinal and latitudinal coordinates, and/or other locational coordinates of the customer's mobile device) is substantially matched (for any desired amount of time, as discussed more below) with the merchant's location (e.g., GPS coordinates, address, and/or other locational coordinates) during the effective period of one of the merchant's promotions, the described systems register such a match as a conversion on the promotion. Moreover, in some implementations, the described systems charge the merchant a fee (or deduct credits or some other from the merchant and/or the merchant's account) for each registered conversion.

In some implementations, the described systems and methods are configured to register a conversion the moment that a customer enters (or comes within a set distance from) a merchant's location. In some other implementations, however, the described systems and methods are configured to register a conversion only after a customer has been at (or within a set distance from) a merchant's location for a set period of time. In this regard, the set period of time can be any desired amount of time (e.g., between about 5 seconds and about 8 hours, or any sub-range thereof, such as 1 minute or more) that tends to show that a customer actually entered the merchant's location (e.g., for a meaningful visit) and did not just pass by.

While the methods and processes of the present invention can be particularly useful in the areas of providing promotional materials to customers, allowing customers to find and share desired promotions, and allowing merchants to track conversions on the merchants' promotional materials, those skilled in the art can appreciate that the described methods and processes can be used in a variety of different applications and in a variety of different areas. Indeed, in some implementations, the described systems and methods may be used to provide information of any suitable form (including, without limitation, weather information, warning information, tour information, current traffic information, cellphone usage and balance notifications, prescription fill-up notifications, usage notifications, any suitable type of mobile notifications that are triggered by any suitable event, and/or any other suitable type of information) to one or more people in a designated area, or that enter such designated area during an effective period of such information.

By way of non-limiting illustration, some implementations of the described systems and methods are modifiable such that a person carrying a mobile device having a version of the described mobile app installed thereon can receive information (e.g., an avalanche warning) when such person is in (or enters) a particular area. In another example, some implementations of the described systems and methods allow a customer's location to be tracked (e.g., via wireless technology, such as BLUETOOTH™, GPS tracking, cell tower geolocation techniques, indoor and/or outdoor proximity systems, etc.) within a particular merchant's location (e.g., as the customer goes up and down aisles in a store) to provide the customer with promotions relevant to the customer's position in the merchant's location.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which:

FIGS. 4A-4L each include a screenshot depicting one or more elements of a representative embodiment of the invention;

DETAILED DESCRIPTION OF THE INVENTION

Figure 1:
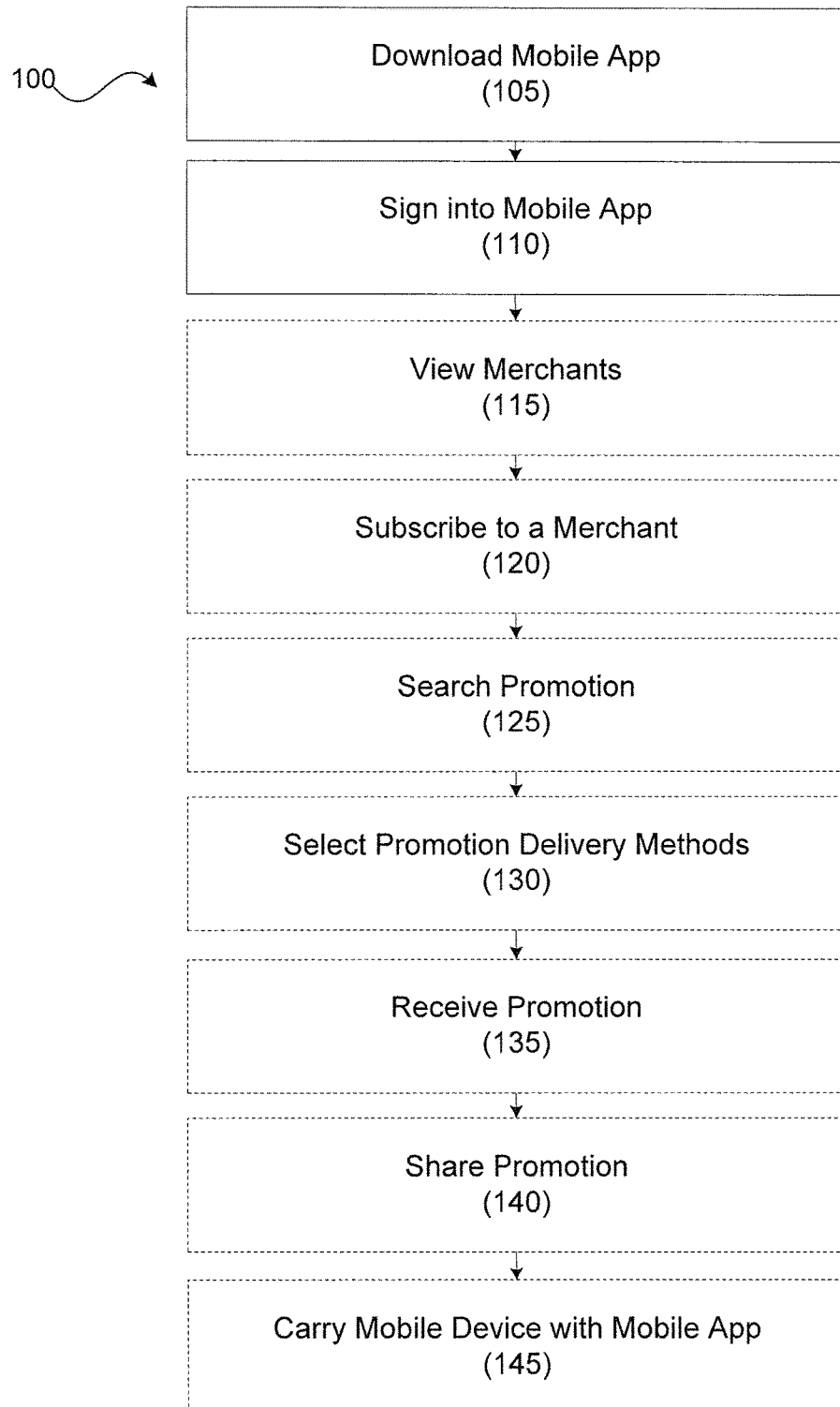
FIG. 1 depicts a flowchart showing a method in which a customer is able to receive and/or search for promotional materials in accordance with a representative embodiment of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of suitable mobile electronic devices, systems and methods for determining position of a customer and/or a merchant's location, social media sites, etc., to provide a thorough understanding of embodiments of the invention. One having ordinary skill in the relevant art will recognize, however, that the invention may be practiced without one or more of the specific details, or with other systems, methods, components, materials, and so forth. In other instances, well-known systems, structures, materials, methods, or operations are not shown or described in detail to avoid obscuring aspects of the invention.

In the disclosure and in the claims, the term conversion (and variations thereof) may be used to refer to a visit by a customer to (or within a set distance from) a merchant location.

As used herein, the term customer (and variations thereof) may refer to virtually any person who has the described mobile app on a mobile device. Some non-limiting examples of suitable customers include one or more consumers, patrons, people, patients, clients, visitors, subscribers to a particular merchant, and/or other people who have the described mobile app on a mobile device and who visit, or who may possibly visit, a merchant location while carrying their mobile device.

As used herein, the terms electronic promotion, promotion, promotional materials, and variations thereof may refer to any suitable form of information that can be sent and/or received through a mobile device and/or another electronic device (e.g., a computer) to help persuade a customer to take or continue taking a certain action (e.g., to visit a merchant location). Some examples of such promotions include texts (e.g., via a short message service or otherwise), e-mails, in-app advertisements, coupons, calendar notifications, social media posts, website posts, narrowband advertisements, television advertisements, radio advertisements, narrowband advertisements, and/or any other suitable information, in any suitable format (including, without limitation, as text, image, animation, video, and/or audio). In some embodiments, however, the promotions comprise any suitable amount of text that is less than about 200 characters (e.g., less than about 140 characters).

As used herein, the term merchant (and variations thereof) may refer to any suitable person, group, entity, organization, provider, retailer, convention organizer, location, lawyer, doctor, dentist, therapist, professional, stylist, service provider, mechanic, repairman, advertising agency, and/or other person and/or business that has a merchant location (or that is working for or on behalf of another that has a merchant location) that a customer can visit.

As used herein, the term merchant location, merchant's location, and variations thereof may refer to any suitable location (including, without limitation, any store; restaurant; establishment; clinic; theater; retail center; mall; church; fair; market; event; office; salon; garage; yard sale; garage sale; charity event; location where food, goods, and/or services are provided; service center; dealership; school; showroom; food truck; hotel; motel; and/or any other suitable physical location of a merchant) that a promotion could directly or indirectly encourage a customer to visit.

As used herein, the term user (and variations thereof) may refer to any person who may become a customer (e.g., a person who could install or otherwise log into the described app on a mobile device).

The following disclosure of the present invention is grouped into two subheadings, namely "Representative Methods" and "Representative Embodiment of an Operating Environment." The utilization of the subheadings is for convenience of the reader only and is not to be construed as limiting in any sense.

Representative Methods

The present invention relates to systems and methods for advertising. In particular, some embodiments of the present invention relate to systems and methods for using one or more mobile devices to provide promotional materials to one or more customers, based (at least partially) on the geographic location of such mobile devices. In this regard, some embodiments of the described systems and methods include a piece of software that is usable on a customer's mobile electronic device (hereinafter referred to as an app or a mobile app). While this app can serve any suitable purpose, in some embodiments, it allows customers to (among other things): subscribe to merchants so as to receive promotion from (or relating to) such merchants; be able to share promotions with others through one or more social media sites, e-mails, texts, calendar notifications, and/or in any other suitable manner; search for and otherwise pull information on merchants and/or promotions; and/or be tracked (e.g., via their mobile devices), such that merchants can target specific promotions to customers, based (at least partially) on the location of such mobile devices (and, presumably, the customers).

In accordance with some embodiments, the described systems and methods also allow merchants to (among other things): provide the described systems with coordinates for one or more merchant locations, determine how many customers are within a certain distance (e.g., a promotion area) from a particular merchant location, resize the promotion area in an effort to modify the number of customers that are located in the promotion area at any given moment, send promotions to customers in (and/or that enter into) the promotion area, and/or to know that a customer having the described app has entered into the merchant's location.

The described methods can be accomplished in any suitable manner that allows merchants to target customers based (at least partially) on the customers' location. To provide a better understanding of the described methods, several embodiments of suitable methods and systems are described below in more detail. Specifically, the following discussion first provides a detailed description of a non-limiting embodiment of a method showing how a customer can interact with the described systems and methods. Following such discussion, a detailed description is provided of a non-limiting embodiment of a method showing how a merchant can interact with the described systems and methods. It should be noted, that each of these methods can be modified in any suitable manner. For instance, any suitable step can be added to, be removed from, be modified, and be reordered within each of the methods. It should also be noted, that while the term step is used herein, that term may be used to simply draw attention to different portions of the described methods and is not meant to delineate a starting point or a stopping point for any portion of the methods, or to be limiting in any other way.

With reference now to FIG. 1, that figure shows a representative embodiment of a method 100 in which a customer interacts with the described systems and methods to receive promotions. While this method can include any suitable element, step 105 shows that, in some embodiments, the method begins as a mobile app (or any other suitable software) is downloaded to (or otherwise initiated on) a mobile electronic device (e.g., a smart phone, a cell phone, a feature phone, a PDA, a tablet, a laptop, a handheld computer device, a portable computer device, a computer device 400 (as discussed below), and/or any other suitable device that can run the mobile app. In some embodiments, however, the mobile app is downloaded onto a smart phone, a cell phone, a feature phone, a PDA, and/or other suitable electronic device that is typically carried on a customer's person, in the customer's daily travels.

Although the described mobile app can serve any suitable function, in some embodiments, the app is configured to allow customers to receive, search for, share, and otherwise take advantage of merchant promotions. More specifically, and as stated earlier, some embodiments of the app allow customers to (among other things): search for merchants offering promotions, subscribe to particular merchants so as to receive promotions from (or relating to) such merchants; be able to share promotions (e.g., virally) with others through one or more social media sites (e.g., FACEBOOK®, GOOGLE+®, TWITTER®, etc.), e-mails, texts, website postings, and/or in any other suitable manner; and/or be tracked (e.g., via their mobile devices), such that merchants can target specific promotions to customers, based (at least partially) on the location of such mobile devices.

Where the mobile app is not already on a mobile device (e.g., as OEM software or otherwise), a user/customer can download and install the app in any suitable manner, including, without limitation, by downloading the app from a website (e.g., www.mobileadreach.com and/or any other suitable site); downloading the app from an app store (e.g., the PLAY STORE™, the APP STORE™, etc.); opening the app from an e-mail carrying the app as an attachment; scanning a quick response ("QR") code, a barcode, a matrix code, and/or any other suitable code that is capable of directing the device scanning the code to download, install, and/or otherwise use the app; and/or in any other suitable manner. In one example, a merchant posts one or more markings (e.g., QR codes) in a place where a user can scan the code (e.g., on table tents, posters, television commercials, website advertisements, in menus, and/or any other suitable location). In this example, once the user scans the code with the user's mobile device (e.g., smart phone, tablet, etc.), the user is given the opportunity to download and install the app.

Figure 2A:
FIGS. 2A-2I each include a screenshot depicting one or more elements of a representative embodiment of the invention.
Figure 2B:
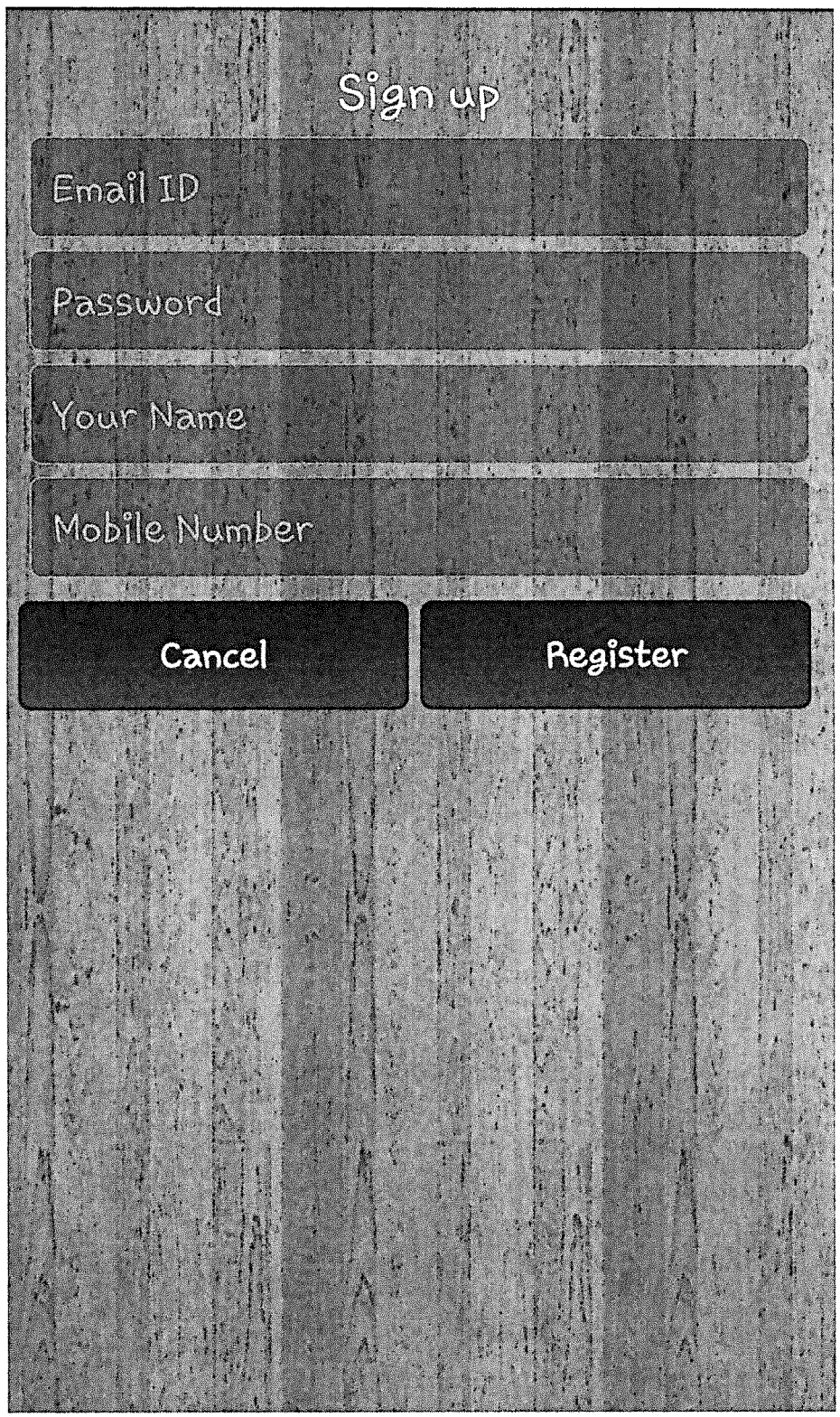

Step 110 shows that, in some embodiments, after the described mobile app is downloaded/installed on a mobile device, the customer can sign into the app. While this signing-in process can occur in any suitable manner, FIG. 2A shows a representative embodiment in which the user is allowed to sign up/register as a customer. While the registration process can require any suitable amount and/or type of information about the user/customer (including, without limitation, the customer's name, sex, age, race, e-mail address, password information, telephone number, physical address, employment status, etc.), FIG. 2B shows that, in some embodiments, the registration process requires relatively little information about the customer (e.g., a password, the customer's e-mail address, name, and mobile number).

The customer can log into the app in any suitable manner. By way of non-limiting illustration, FIG. 2A shows that, in some embodiments, the customer is able to log into the app by inputting the e-mail address and password the customer provided in the registration process and/or by logging in through a social media account (e.g., FACEBOOK®, GOOGLE+®, TWITTER®, INSTAGRAM®, etc.). Indeed, in some embodiments, instead of directly registering through the app to use the app, the described systems and methods allow a customer to log into the app through one or more of the customer's social media accounts (e.g., FACEBOOK®, GOOGLE+®, TWITTER®, etc.). In some such embodiments, information about the customer is automatically passed from such social media accounts to the described systems.

Continuing with the method 100 of FIG. 1, step 115 shows that, in some embodiments, the customer is able to view information on one or more merchants through the app. In this regard, the customer can access any suitable information about the various merchants, including, but not limited to, menus, pricing, hours, customer reviews, interactive directions, current promotions available, retail type, promotions, and/or any other suitable criteria. In this regard, FIG. 2C (as well as FIGS. 2E and 2F) shows that, in some embodiments, a customer is able to see customer reviews and obtain directions to a variety of merchants.

Figure 2C:
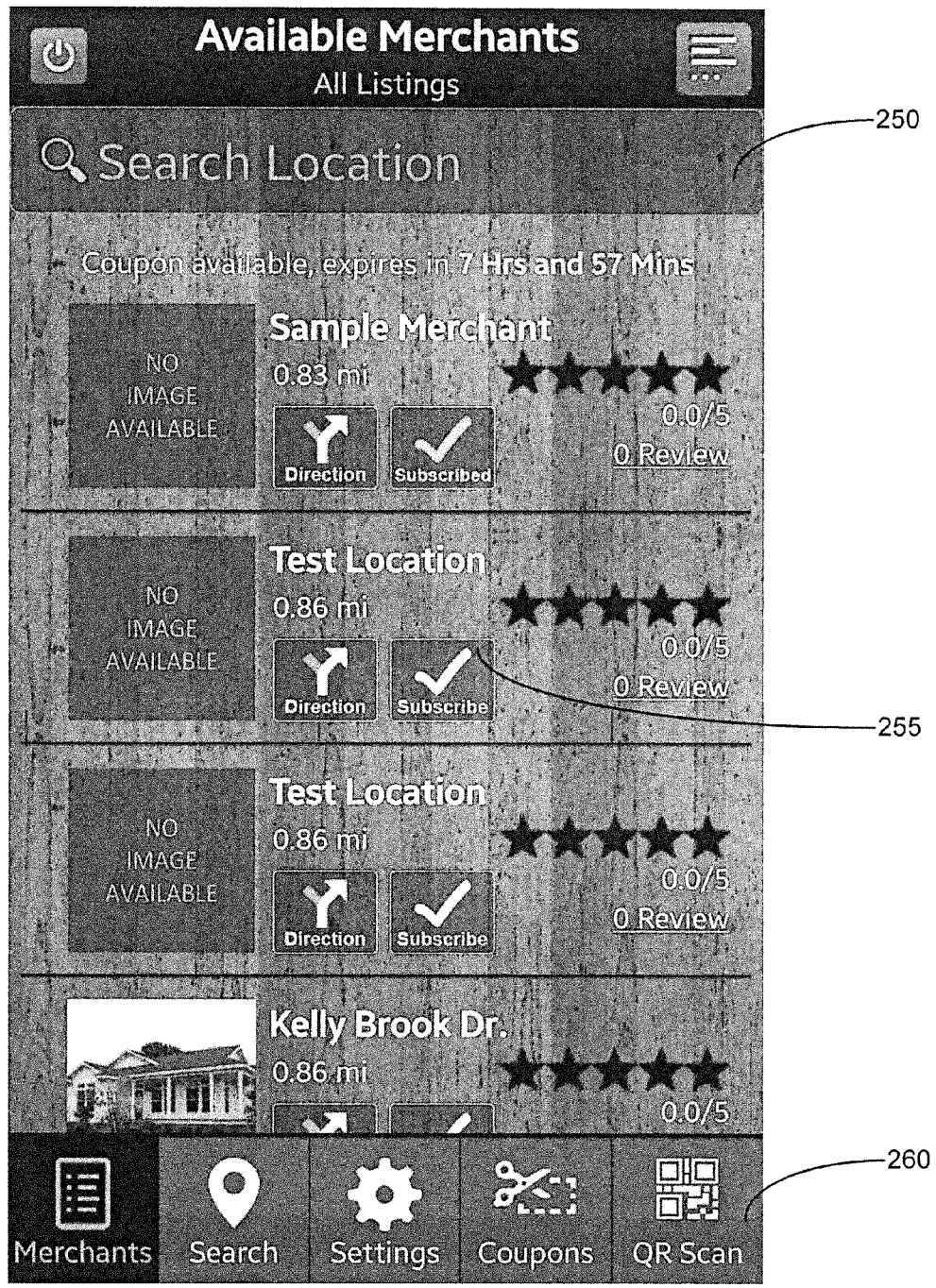
Figure 2D:
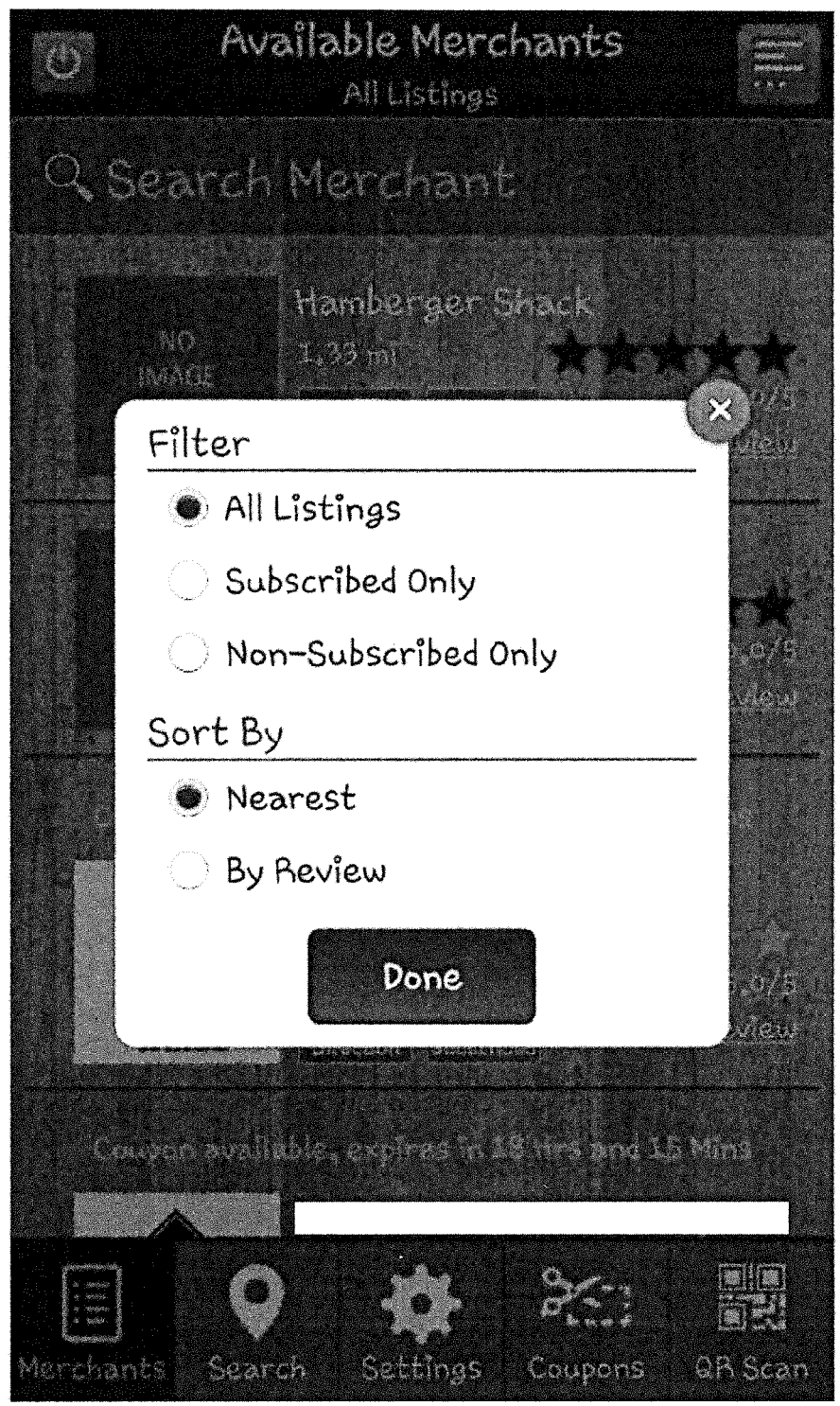
Figure 2E:
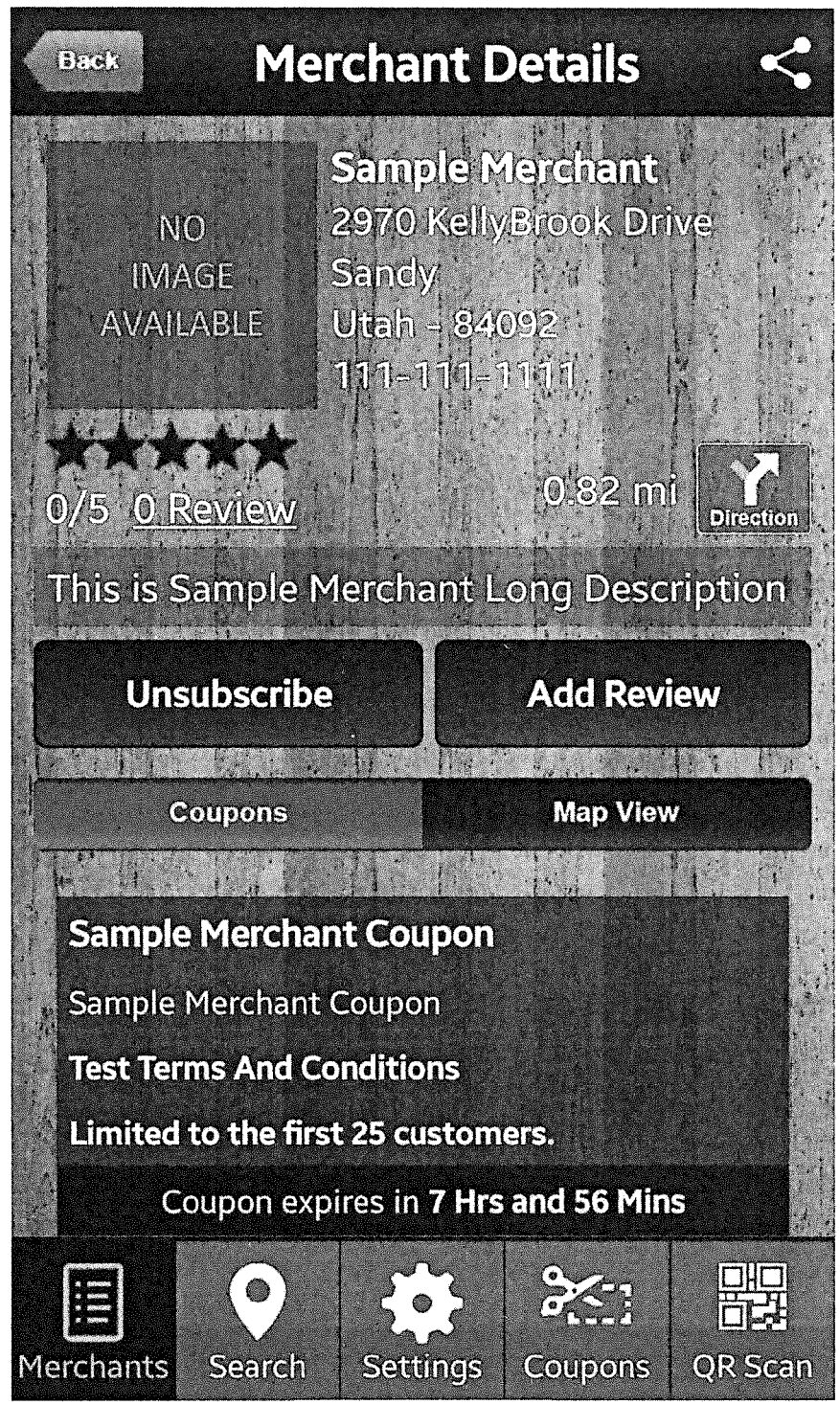
Figure 2F:
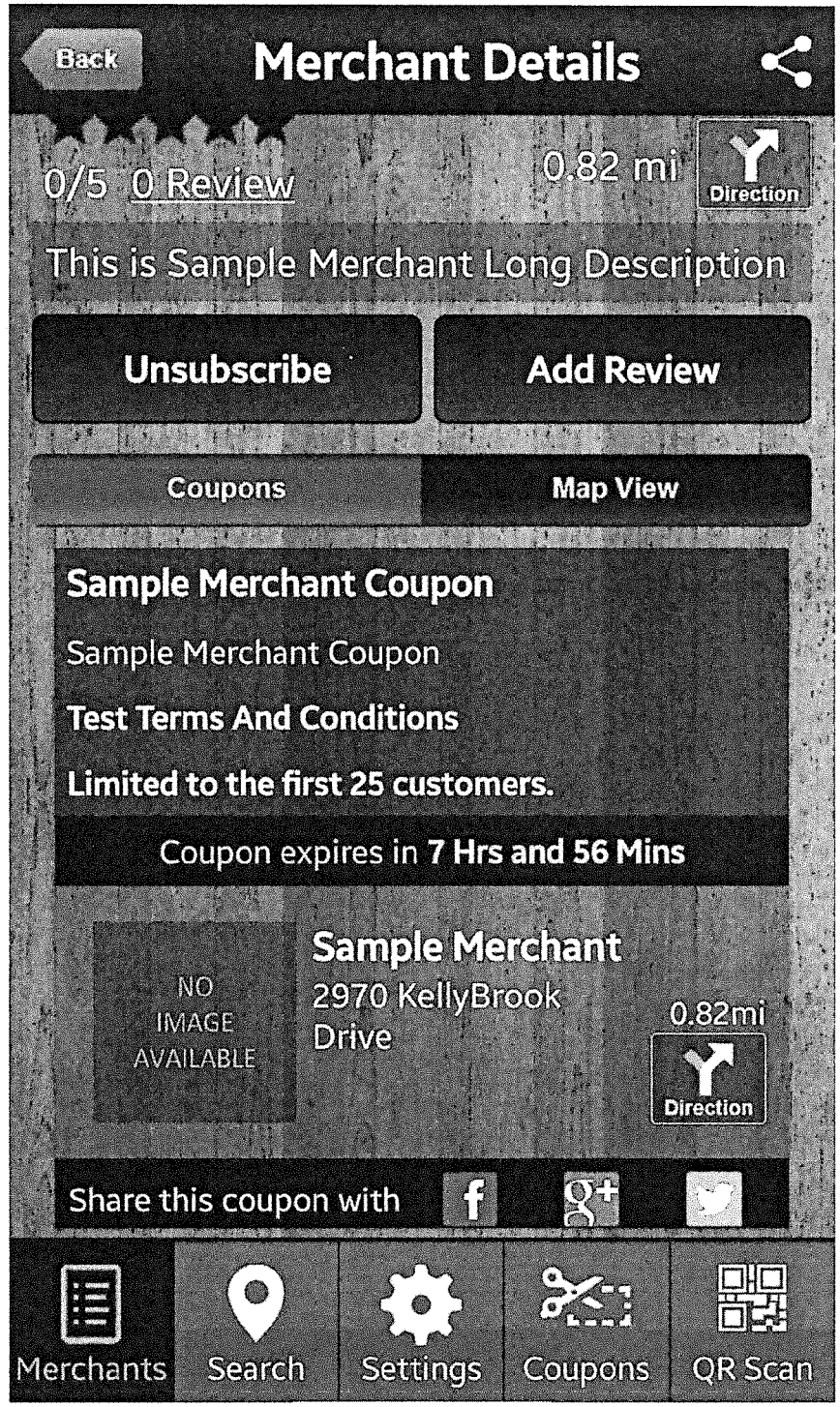

While the customer and/or the app can determine which merchants the customer is able to review, FIG. 2C shows that, in some embodiments, the app includes a search feature 250 that allows the customer to search for merchants based on information input by the customer. In this regard, the app can search for merchants based on any suitable search criteria. Some examples of suitable search criteria include, but are not limited to, the name of a merchant, a merchant location, the type of goods or services provided by a merchant, hours of operation, the proximity of merchants to the customer, proximity of merchants to a customer's travel route and/or destination, and/or any other suitable criteria that can help a customer find a desired merchant or merchant location. FIG. 2D further shows that, in some embodiments, the customer is even able to search for: all merchants listed in the app, merchants to which the customer has subscribed, merchants to which the customer has not subscribed, merchants based on proximity to the customer, and/or merchants based on customer review's/ratings.

Returning to FIG. 1, step 120 shows that, in some embodiments, the customer is able to subscribe to one or more merchants. While a subscription to a merchant may serve any suitable purpose, in some embodiments, such a subscription opts a customer into receiving (and/or otherwise being able to access and take advantage of) promotions from the corresponding merchant. Indeed, in some embodiments, merchants are only able to send (or push) promotions to customers that are specifically subscribed to such merchants. Thus, in some such embodiments, customers need not receive promotions from irrelevant merchants.

Where the described systems and methods allow a customer to subscribe to one or more merchants, the customer can subscribe in any suitable manner, including, without limitation, by subscribing through the app, by sending an e-mail (e.g., to the merchant, to the app's administrator, etc.), by sending a text, by selecting a link in a calendar notification, and/or in any other suitable manner. In some embodiments, however, FIG. 2C shows that a customer is able to subscribe to (and, in some embodiments, unsubscribe from) a particular merchant by selecting a subscribe feature 255 in the app. In some other embodiments, FIG. 2C further shows the app comprises a marking scanner (e.g., a QR scanner) feature 260 that allows a customer to subscribe to a particular merchant by scanning a marking (e.g., QR code) pertaining to such merchant. In this regard, it should be noted that some other embodiments in which a user/customer scans a merchant's marking with a scanner that is outside of the app, the customer's electronic device may be searched for the app, and if the app is not found on the device, the customer is given the opportunity to download/install the app. If, however, the app is found on the device, in some embodiments, once the customer scans a particular merchant's marking, the customer is automatically subscribed to such merchant.

Figure 2G:
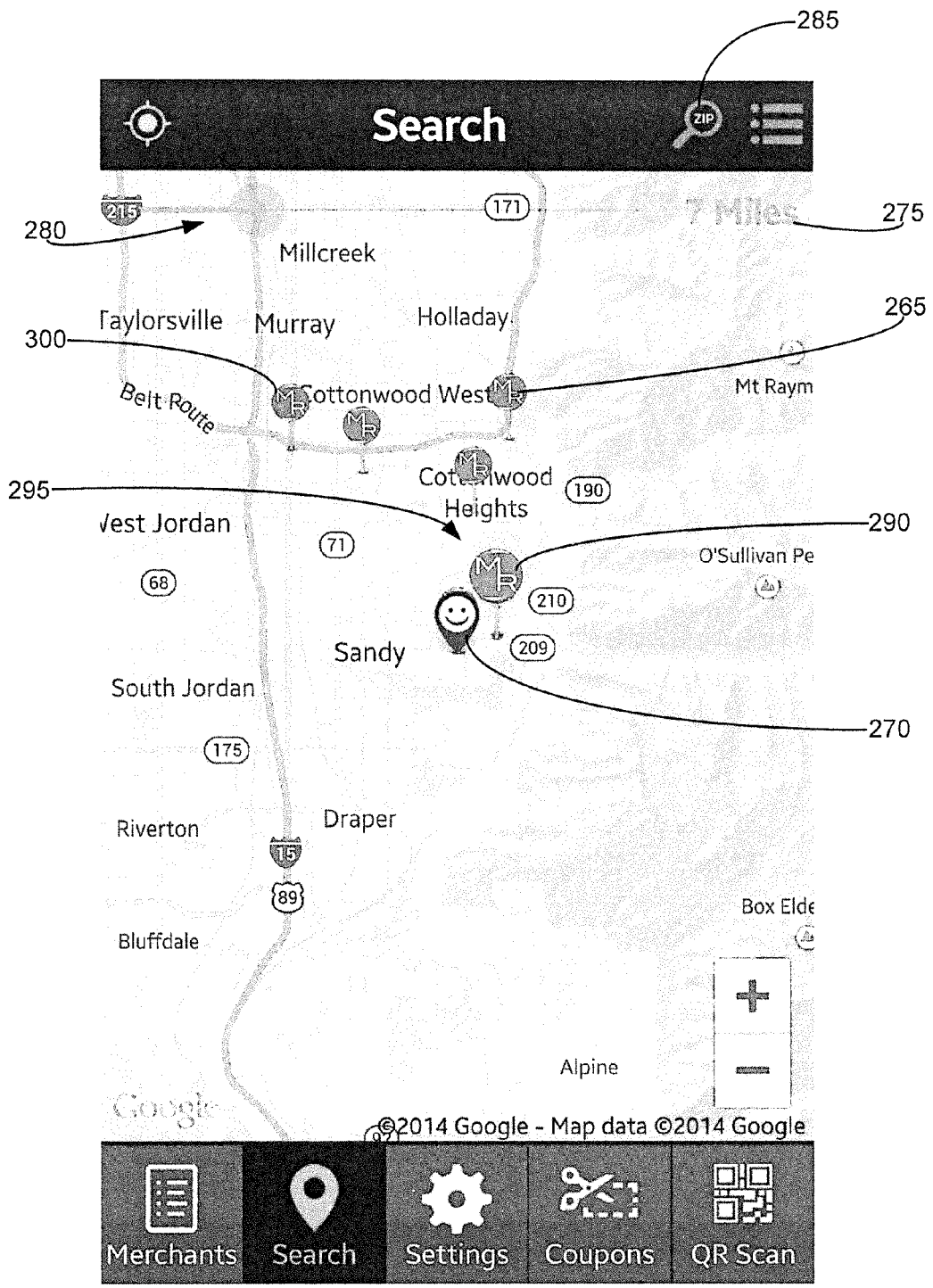

Returning again to FIG. 1, step 125 shows that, in some embodiments, a customer is allowed to search for promotions. In this regard, the customer can search for (or pull) promotions in any suitable manner, including, without limitation, based (at least partially) on the proximity of a merchant's location to the customer, the location of a merchant's location, the proximity of a merchant's location to a customer's navigation route (e.g., the proximity to a customer's travel route entered into navigation software and/or the mobile app), whether or not the merchant is currently offering a promotion, merchant location hours, customer reviews, type of goods or services provided a merchant location, and/or any other suitable criteria. By way of non-limiting example, FIG. 2G shows that, in some embodiments, the app is configured to allow a customer search for merchants in proximity to the customer. More specifically, FIG. 2G shows that, in some embodiments, participating merchants 265 are displayed on a map in relation to the customer 270. Moreover, FIG. 2G shows that, in some embodiments, the customer 270 is able to increase and/or decrease a search area 275 (e.g., a search radius around the customer and/or other suitable search area). In such embodiments, the search area can be modified in any suitable manner, including, without limitation, by increasing or decreasing a search area based on distance of one or more merchants from the customer, by increasing or decreasing a search radius based on travel time to one or more merchants from the customer's current location, by entering a street address and/or zip code, by entering a travel route into the app and/or a navigation tool, and/or in any other suitable manner. By way of non-limiting illustration, FIG. 2G shows that, in some embodiments, the customer is able to adjust a search area 275 based on the distance from the customer 270 to one or more merchants. More particularly, FIG. 2G shows that, in some cases, the customer 270 can modify the search area 275 by simply adjusting a length of the radius (e.g., via sliding adjustment mechanism 280).

In some embodiments, instead of focusing the search area on the customer's current location, the described app (or a website running similar software to the app) can allow the customer to search a search area 275 that is not necessarily based on the customer's current location. For instance, if a customer will be traveling to a destination and desires to find promotions in that destination area, in some embodiments (as shown by the zip code feature 285 on FIG. 2G), the customer can enter a zip code, state, city, town, county, country, address, and/or any other suitable description of a location, such that the customer can search for promotions in (and around) that particular area.

Although in some embodiments, all merchants in a particular search area are shown in the app (and/or on a website) in the same way, in some embodiments, the described app distinguishes between merchants that are currently providing a promotion and those that are not. While the app can distinguish between such merchants in any suitable manner (including, without limitation, by labeling the two types of merchants differently), FIG. 2G shows that, in some embodiments, merchants that are currently providing a promotion 290 have a different visual presentation (e.g., have rings 295 around the merchant's marker 265) than do merchants that are not currently offering a promotion 300.

Figure 2H:
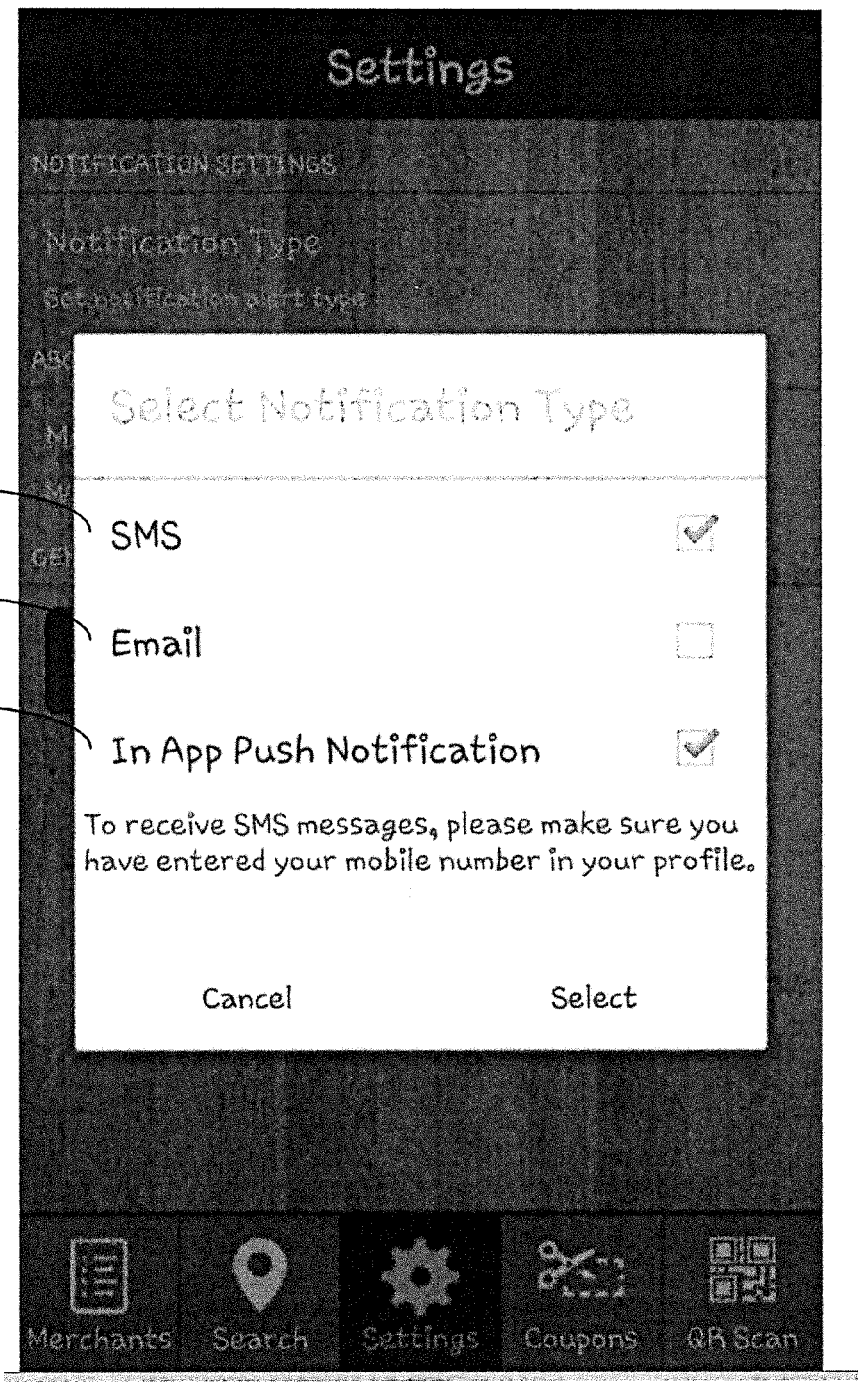

Returning again to FIG. 1, step 130 shows that, in some embodiments, the customer is able to select the manner in which promotions are provided to the customer. In this regard, while merchants can send promotions to customers in any suitable manner, including, without limitation, by sending promotions to customers via in-app push notifications, e-mail, text (e.g., SMS or any other suitable texting protocol), by posting such notifications on one or more social media websites that are relevant to the customers, by providing promotions through a calendar feature (e.g., GOOGLE® calendars and/or any other suitable calendaring feature, and/or in any other suitable manner, in some embodiments, the customer is able to select which ways promotions are sent to the customer. By way of non-limiting illustration, FIG. 2H shows that, in some embodiments, the customer can select whether or not he or she will receive promotions via text 305, e-mail 310, and/or in-app push notifications 315.

Figure 2I:
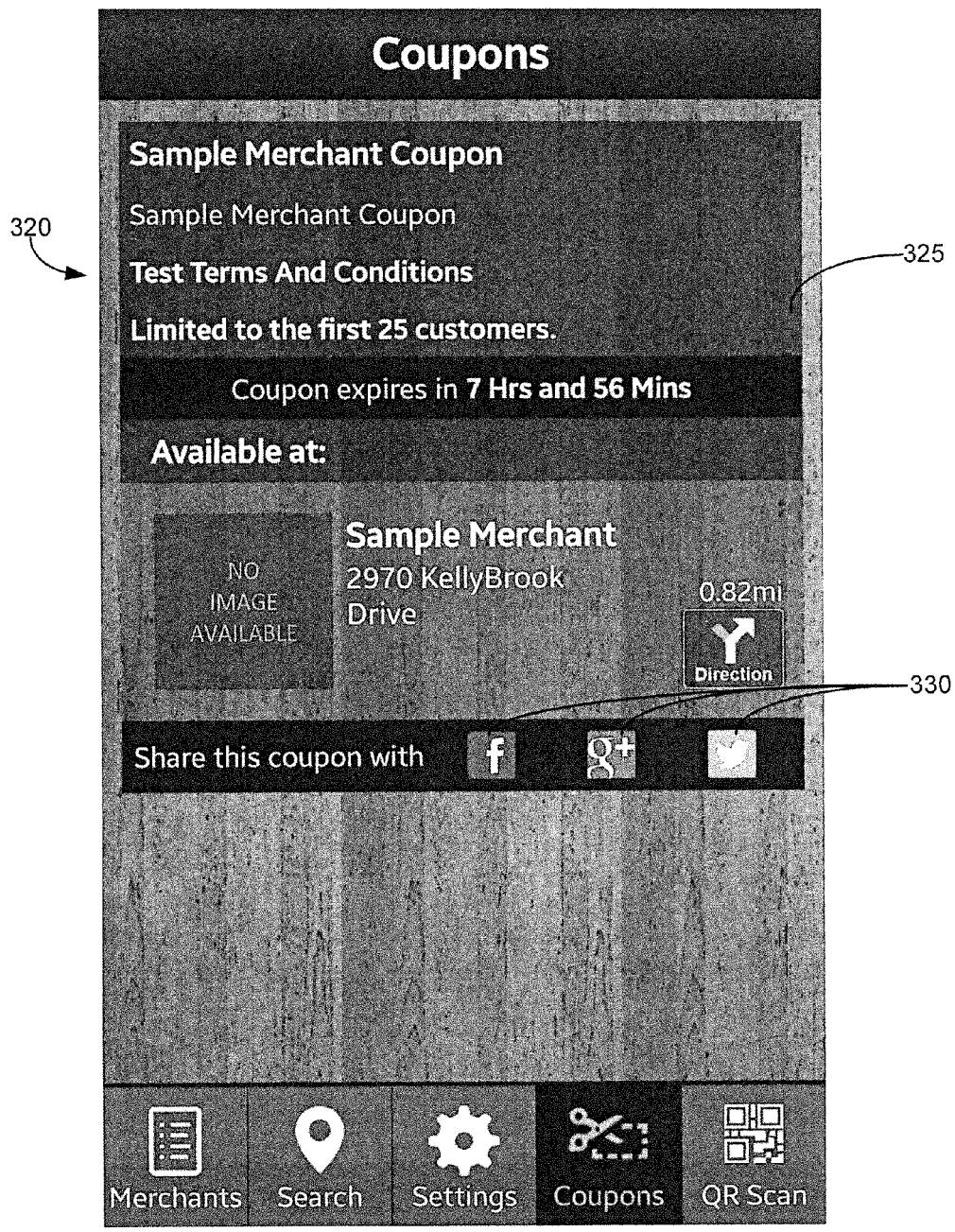

With reference now to step 135 in FIG. 1, that step shows that, in some instances, the customer receives one or more promotions. As previously mentioned, these promotions can be received/accessed in any suitable manner. Indeed, in some embodiments, the promotions are pushed to the customer's mobile device having the app as a text message, as an in-app push notification, in an e-mail, via a posting on a social media feed that is likely to be viewed by the customer, and/or in any other suitable manner that allows messages to be sent to the customer. Indeed, in some embodiments, the promotions are even available on computer devices besides the customer's mobile device (e.g., on a website that is accessible on any suitable computing device with Internet capabilities). In some embodiments, however, the promotions are accessed (or pulled) by the customer from a website displaying the promotions, by searching for and/or requesting the promotions through the app and/or a website (e.g., www.mobileadreach.com and/or any other suitable site), and/or in any other suitable manner. In accordance with some embodiments, FIG. 2I shows that promotions (e.g., coupons 320) from merchants to which the customer is subscribed are sent to the customer's device as in-app push notifications 325.

Returning again to FIG. 1, step 140 shows that, in some embodiments, once the customer receives or otherwise accesses a promotion (and/or any other suitable information), the customer is optionally able to share the promotion, links to merchants, merchant and/or merchant location subscriptions, calendar notifications relating to a promotion, and/or any other suitable information with others. In this manner, promotions (and/or other information) can be virally propagated. In this regard, customers can share the promotions with others in any suitable manner, including, without limitation, via e-mail, text, sharing the mobile app, sharing a marking (e.g., QR code) pointing to the app, sending calendar invites to others, posting the promotion on one or more websites, and/or posting the promotions on one or more social media sites. By way of non-limiting illustration, FIG. 2I shows that, in some embodiments, a customer can easily share a particular promotion 325 with others by selecting a link 330 that posts the promotion to such customer's social media feed (e.g., FACEBOOK®, GOOGLE+ ®, TWITTER®, etc.).

Continuing with FIG. 1, step 145 shows that, in some embodiments, as part of the described method 100, the customer carries his or her mobile device. In this manner, the described systems and methods can track the customer's movements and determine if and when the customer visits a merchant location (e.g., in response to a promotion). Accordingly, the described systems and methods can determine and log the number of conversions that are made on the various promotions.

The described systems can track the location of the customers' mobile devices in any suitable manner, including, without limitation, by: collecting the GPS coordinates from one or more customers' mobile devices; conducting multi-lateration of radio signals between radio towers and/or transmitters (e.g., cell tower triangulation) for applicable customer devices, performing global system for mobile communications ("GSM") localization for the desired devices; performing network-based geolocation techniques for one or more customer devices; using one or more handset-based geolocation techniques/systems, SIM-based geolocation techniques/systems, Wi-Fi positioning techniques/systems, hybrid positioning techniques/systems, geographical region monitoring (e.g., for some MS® systems) techniques/systems, BLUETOOTH® location techniques/systems, BLUETOOTH® low-energy beacons techniques/systems, low-powered transmitter location techniques/systems, indoor proximity systems/techniques, outdoor proximity systems/techniques, IBEACON® location systems/techniques, beacon region monitoring techniques/systems, crowd-sourced Wi-Fi5 systems/techniques, and/or any other suitable mobile device location techniques/systems; allowing a customer to input the customer's location into the customer's device (e.g., via moving a marker on an interactive map, entering an addresses in the described app, and/or in any other suitable manner); and/or by using any other suitable system, software, and/or technique for tracking the position of a mobile device. In some embodiments, however, the described systems track the GPS positions of customers' mobile devices when such a feature is active and switch to a Wi-Fi positioning system (and/or another suitable technique/system) when the devices' GPS feature is turned off.

Indeed, in some embodiments, the described systems and methods track the location of one or more customer devices through a combination of location techniques/systems (e.g., cellular, BLUETOOTH®, Wi-Fi, and GPS device location techniques/systems). Additionally, in some other embodiments, the described systems and techniques are configured to switch between one or more location techniques/systems to track customer devices. For instance, in some cases in which the described systems and methods are configured to track one or more customer devices via GPS, and the GPS signal to a specific device is lost, some embodiments of the described systems and methods are configured to determine the location of such a device via cell-tower triangulation, crowd-sourced Wi-Fi5, IBEACON® technology, and/or any other suitable technique/system. In still other embodiments, as a merchant begins to implement the described systems and methods, the merchant is provided with (or otherwise obtains) a transmitter and/or receiver (e.g., an indoor/outdoor proximity detector) that is able to accurately determine when a customer is present at the merchant's location.

The described systems and methods can be modified in any suitable manner that allows them to properly register conversions. Indeed, in some embodiments, the described systems and methods are configured to allow a merchant to define (and adjust the size of) one or more conversion areas (or areas in which a customer's presence during a promotion's effective period qualifies as a conversion). Indeed, in some embodiments, a merchant (or the described systems) is able to define a first conversion area, a second conversion area, and/or any other desired conversion area. In some embodiments, a merchant is able to define a first and a second conversion area.

While the first and second conversion areas can have any size relationship with respect to each other, in some embodiments, the first conversion area is smaller than the second conversion area. For instance, some embodiments of the first conversion area extend any suitable distance (e.g., between about 1 foot and about 2,000 feet, or any suitable sub-range thereof, such as about 15 feet)) from a desired place (e.g., an entrance, a till, and/or any other suitable location) at a merchant's location. Additionally, in some embodiments, the second conversion area extends any suitable distance (e.g., between about 10 feet and about 5,000 feet, or any suitable sub-range thereof, such as about 200 feet)) from a desired place at a merchant's location that allows the second conversion area to be larger than the first conversion area.

Figure 2J:
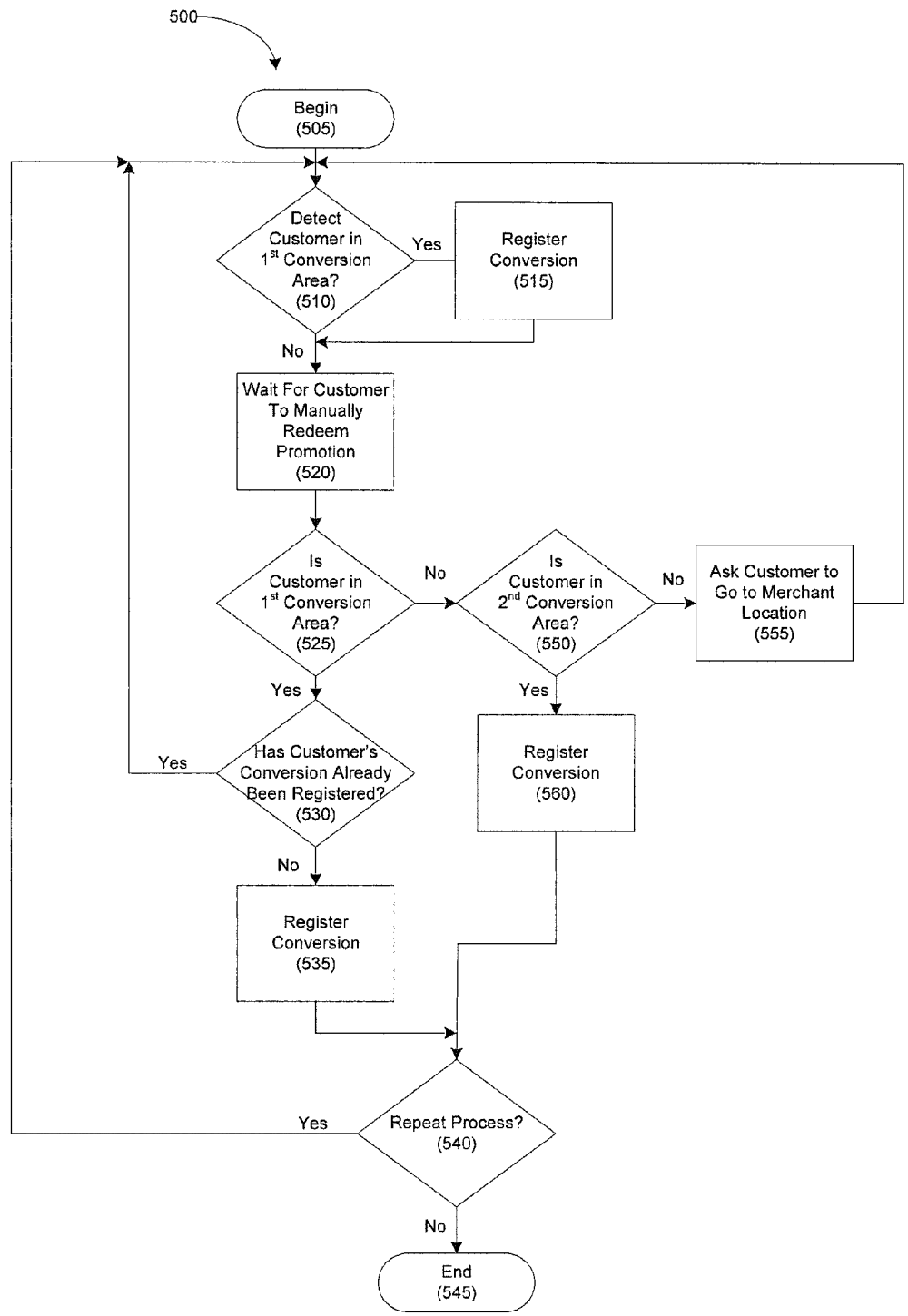
FIG. 2J depicts a flowchart showing a representative method for registering conversions.

The described systems and methods can implement multiple conversion areas for any suitable purpose and in any suitable circumstance (e.g., when an exact location of a customer's mobile device is difficult to determine, when two or more merchant locations are in close proximity to each other, etc.). In some embodiments, however, such a technique is useful in malls and/or other locations where different merchant locations are in relatively close proximity to each other.

Where the described systems and methods include a first and a second conversion area, the described systems can register a conversion in any suitable manner. By way of non-limiting illustration, FIG. 2J illustrates a representative embodiment of one such method 500. In particular, FIG. 2J shows that after beginning at step 505, some embodiments of the method 500 continue at step 510 as the described systems determine whether or not a customer is present in a merchant's first conversion area during a promotion's effective period. If the system determines that a customer is present in the first conversion area during a promotion's effective period, step 515 shows that a conversion is registered for that customer's visit to the merchant's location, and that the method 500 continues to step 520.

In contrast, if (at step 510) the described systems do not detect a customer's presence in the first conversion area during a promotion's effective period, step 520 show that, in some embodiments, the described systems wait until a customer attempts to manually redeem a promotion. In this regard, a customer can manually redeem a promotion in any suitable manner, including, without limitation, by clicking or otherwise selecting an option on the mobile app (e.g., a redeem promotion button), by inputting information into the mobile app, and/or in any other suitable manner.

At step 525, FIG. 2J shows that, in some embodiments, once a customer manually redeems a promotion, the described systems check to see whether such customer is in the first conversion area. If the customer is in the first conversion area, then step 530 shows that the described systems determine whether a conversion has already been registered (e.g., at step 515) for that customer's visit. If a conversion has already been registered for the customer's visit, then FIG. 2J shows that, in some embodiments, the method 500 returns from step 530 to step 510, where the systems wait to determine when another customer enters into the first conversion area. In contrast, step 535 shows that if the system determines that it has not already registered a conversion for the customer's visit to the first conversion area, a conversion for such visit is registered. Following step 535, FIG. 2J shows that some embodiments of the method 500 continue at step 540, where the described systems are allowed to return to step 510 to repeat the process for one or more new customers or to end at 545.

Returning to step 525, FIG. 2J shows that where the described systems determine that a customer is not present in the first conversion area at the time when the customer tries to manually redeem a promotion, then the method 500 continues to step 550, where the described systems check to see whether such customer is present in the second conversion area during a promotion's effective period. In this regard, if the systems determine that the customer is not present in the second conversion area at such time, then step 555 shows that, in some embodiments, the described systems notify they customer that the described systems are unable to detect the customer's presence at the merchant's location. In some such embodiments, the systems may ask the customer to visit the merchant's location and to then try again to redeem the promotion.

Returning to step 550, FIG. 2J shows that, in some embodiments in which the described systems detect that a customer is present at the second conversion area at the time he or she attempts to manually redeem a promotion and during the promotion's effective period, the method 500 continues to step 560, where the systems register a conversion. FIG. 2J then shows, at step 540, that once such a conversion is registered, the process can return to step 510 and be repeated or it can end at 545.

While the method 500 of FIG. 2J can be modified in any suitable manner, in some embodiments, the described systems are configured to provide a customer with digital material (e.g., a QR code, a text message, a digital coupon, a calendar notification, and/or any other suitable material) when a conversion is registered, or when the customer manually redeems a promotion in either the first or the second conversion area during a promotion's effective period. As a result, in some embodiments, customers may feel obligated to manually redeem a promotion when they are at a merchant's location. As a result, the customer may further help the described systems to determine the customer's location.

Figure 3:
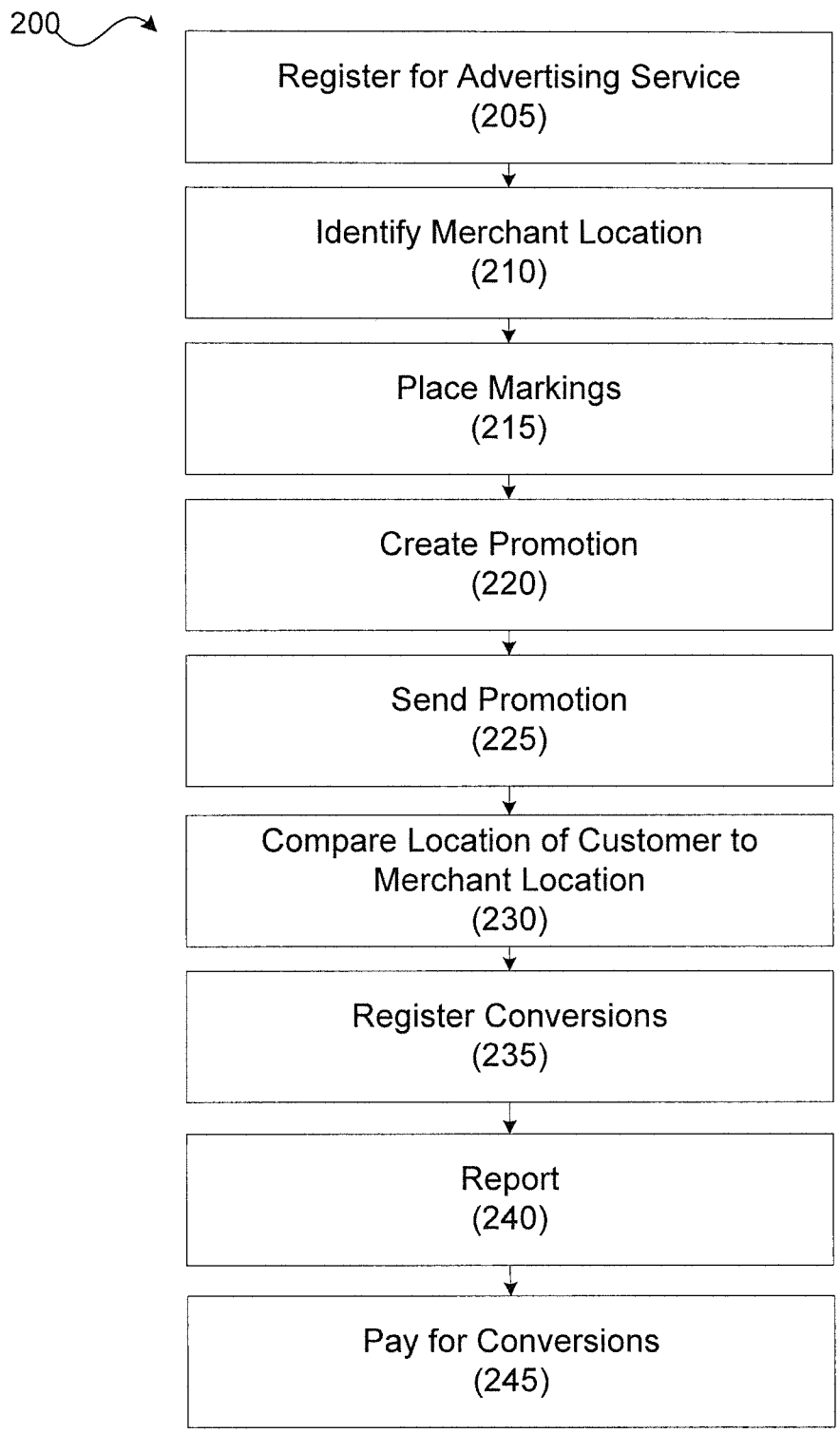
FIG. 3 depicts a flowchart showing a method through which a merchant can provide promotional materials to customers in accordance with a representative embodiment of the invention.
Figure 4A:
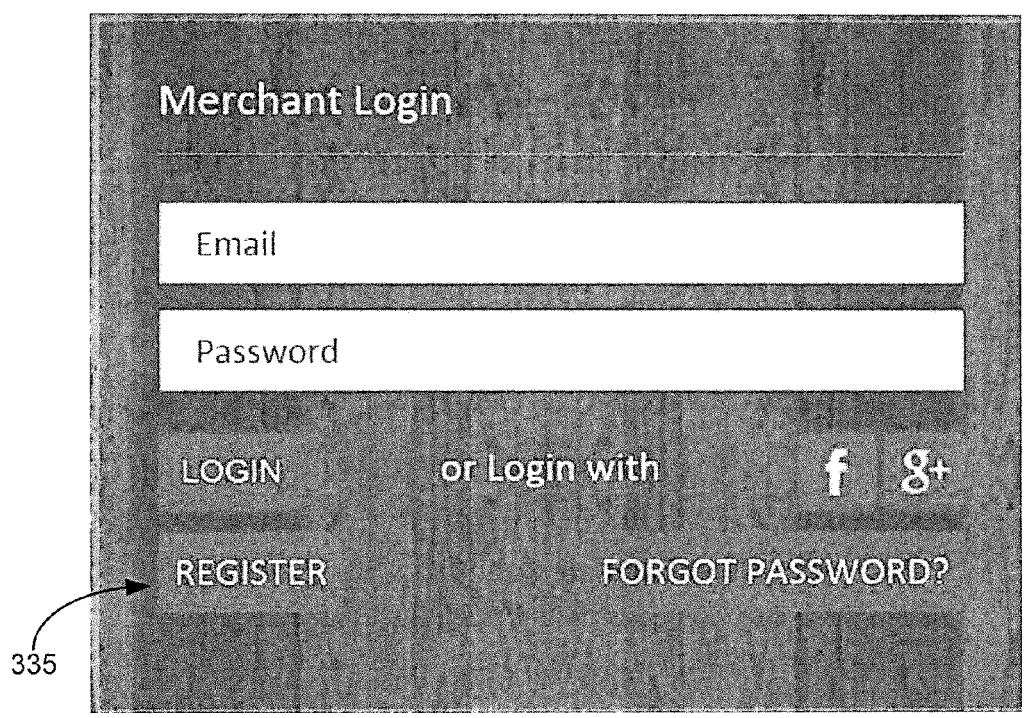

With reference now to the manner in which a merchant can interact with the described systems, FIG. 3 illustrates one such method 200. While this method can include any suitable step, FIG. 3 shows that, in some embodiments, the method 200 begins at step 205 as a merchant registers to use the described systems and methods. Although a merchant can register to use the described systems and methods in any suitable manner, FIGS. 4A and 4B show that while, in some embodiments, the merchant is able to register to use described systems and methods through an app and/or (in certain embodiments) a website (e.g., by selecting the "register" feature 335 and providing information (such as an e-mail address, password, name, street address, phone number, and/or any other suitable information) about the merchant as shown in FIG. 4B), in other embodiments (as shown in FIG. 4A), the merchant can create an account by simply logging in with one or more of the merchant's social media accounts (e.g., FACEBOOK®, GOOGLE+®, TWITTER®, TUMBLR®, SNAPCHAT®, VINE®, etc.). In this regard, in some embodiments in which a merchant logs in through one of the merchant's social media accounts, some information about the merchant is automatically provided to the described systems.

Figure 4C:
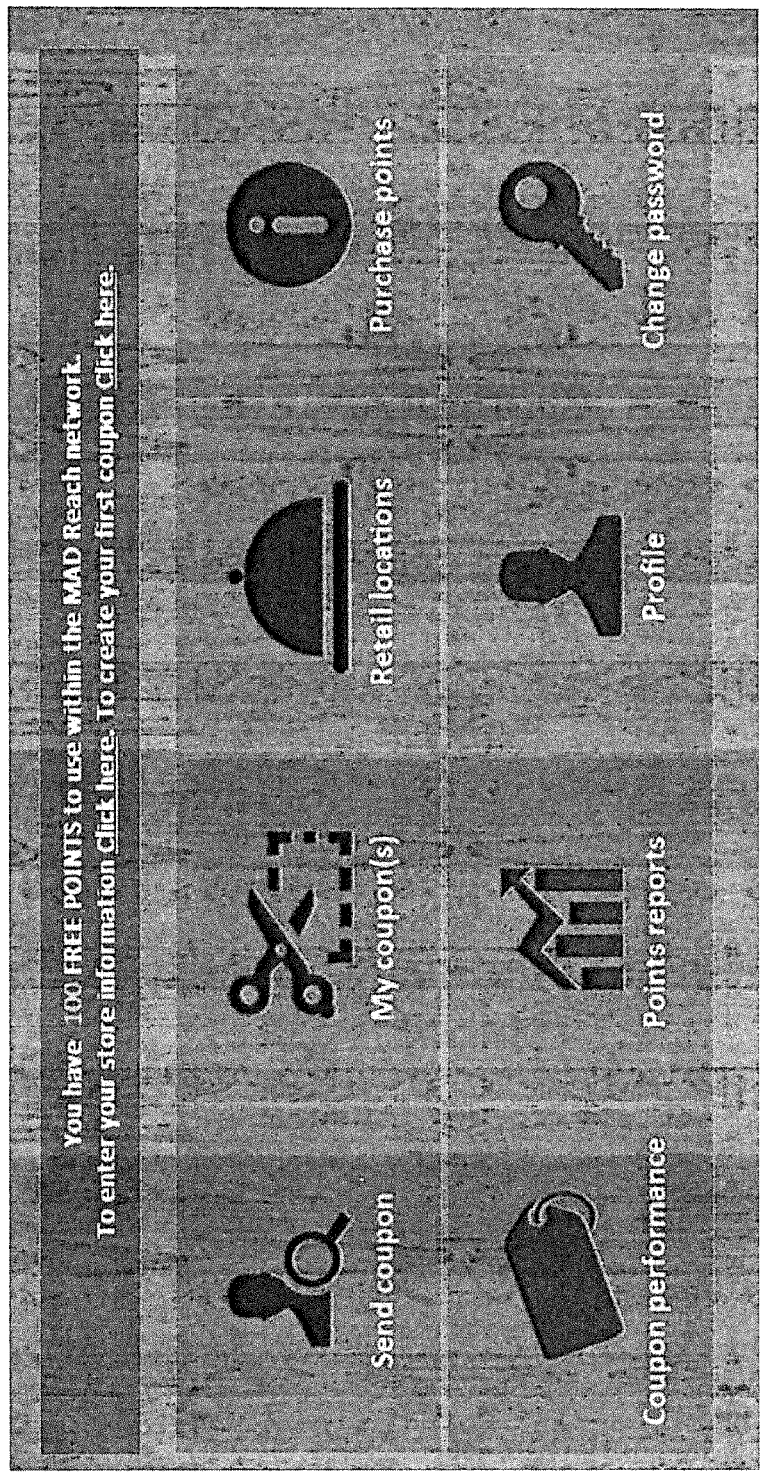

In some embodiments, once a merchant has registered to use (and/or logged into) the described systems, the merchant is allowed to manage the merchant's account. While this can be done in any suitable manner, including, without limitation, via a drop-down menu, an interactive display, and/or any other suitable technique, FIG. 4C show that, in at least some embodiments, the merchant is able to manage various aspects of the merchant's account through an interactive display 340.

Returning to FIG. 3, step 210 shows that some embodiments of the method 200 include identifying one or more merchant locations. While this step can be useful for a variety of reasons, in some embodiments, this allows (among other things): customers to search for the a specific merchant location based on the merchant location's proximity to the customer and/or a desired area (e.g., zip code, street, city, state, etc.); the described systems to provide customers with directions to the merchant location; and/or the described systems and methods to determine when a customer has visited the merchant (e.g., by substantially matching a location of the customer's mobile device with the merchant's location).

Figure 4D:
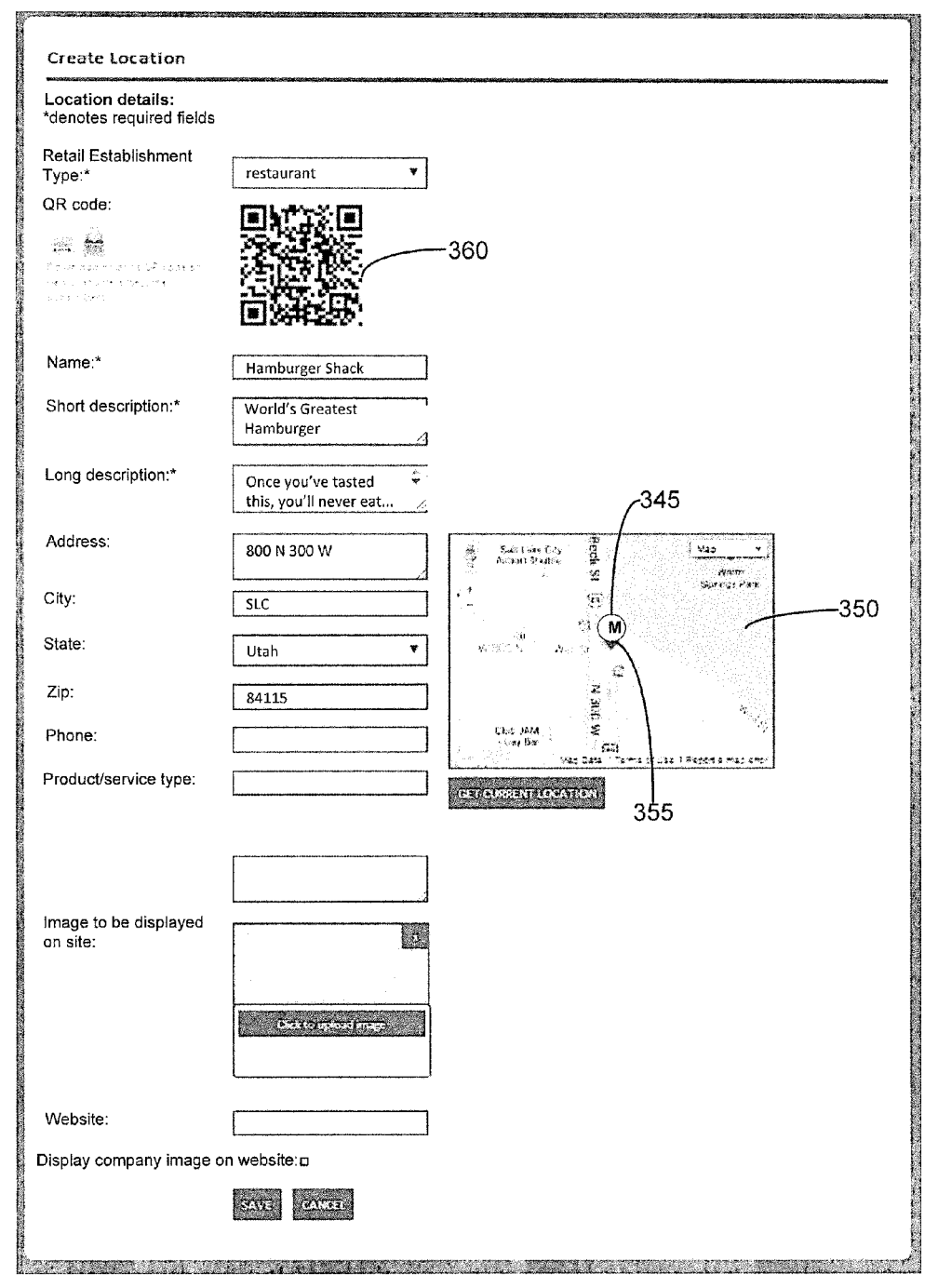

Although the merchant location can be identified in any suitable manner, in some embodiments, the process of identifying a merchant location includes actually identifying a physical location (e.g., a street address, a longitude and latitude, GPS coordinates, cell-tower triangulation coordinates, Wi-Fi, IBEACON™, BLUETOOTH®, and/or any other suitable coordinates) of the merchant location and/or any related areas (e.g., parking lots, walkways, gardens, dining areas, storefronts, display areas, warehousing, grounds, etc.). In this regard, the physical location of the merchant location can be obtained in any suitable manner, including, without limitation, by providing/obtaining a street address of the merchant location, identifying the physical location of the merchant location on a map, providing/capturing GPS coordinates (e.g., via a GPS receiver and/or a mobile device) of the merchant location, providing/capturing cell tower triangulation coordinates for the merchant location, IP address (e.g., when a merchant is signing up a new merchant location through a web interface) and/or in any other suitable manner. By way of non-limiting example, FIG. 4D shows that in some embodiments, a merchant location 345 is provided by entering the street address of the merchant location (e.g., in to a fillable form). Moreover, FIG. 4D shows that, in some embodiments, the merchant location 345 is shown on a map 350. In some such embodiments, the merchant is further able to refine the physical location of the merchant's location by dragging and dropping a marker 355 on the map 350.

As part of setting up a merchant location, some embodiments of the described systems allow the merchant to enter additional information. Indeed, in some embodiments, the merchant is allowed and/or required to any suitable type of information about the merchant and/or the merchant location. In this regard, some suitable and non-limiting examples of such information include a classification of the merchant location (e.g., whether the merchant location qualifies as a restaurant, retail store, movie theater, convention center, and/or another suitable classification), the name of the merchant location, a short description of the merchant location, a long description of the merchant location, a list of products or services provided at the merchant location, an image to be displayed in some cases in which the described systems display information on the merchant location, a URL of one or more websites relating to the merchant, menu items, store items, and/or any other suitable information. In this regard, FIG. 4D (and 4E) shows that, in some embodiments, the merchant is prompted to enter information about the merchant and/or one or more merchant locations. While this information can be used for any suitable purpose, in some embodiments, the entry of such information into the described systems allows customers to search for the merchant location based on key words, classifications, hours of operation, and/or any other suitable search criteria. In other embodiments, the entry of such information into the described systems allow a merchant and/or the described systems to automatically create a web presence (e.g., a web site and/or a webpage displaying some (if not all) of such information about the merchant and/or to display current promotions relating to the merchant and/or any related merchant locations).

Figure 4E:
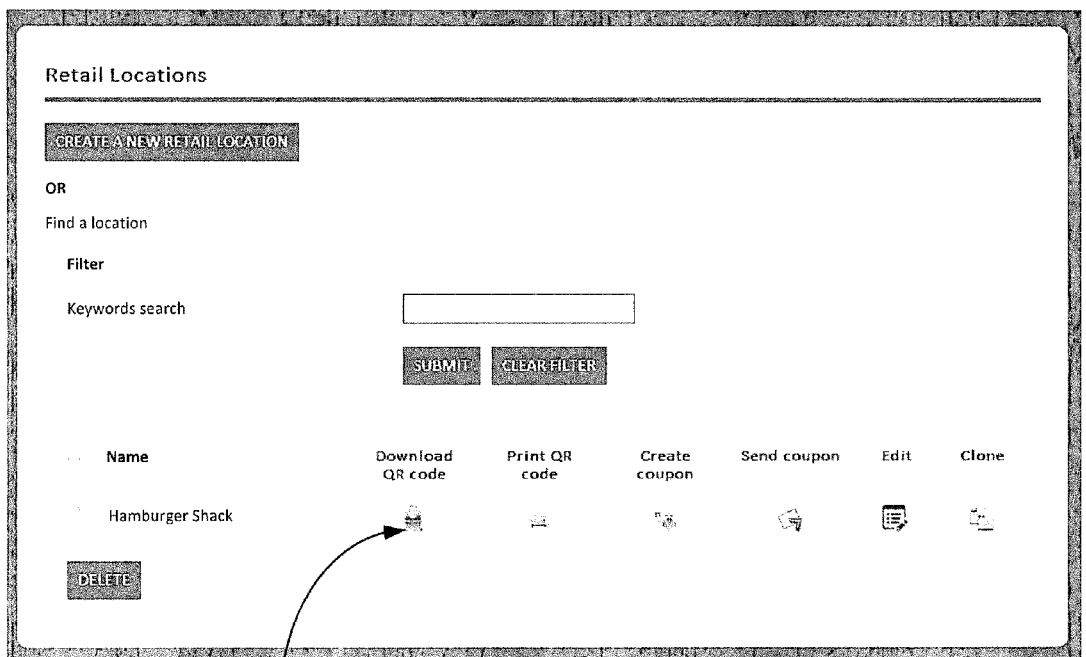

Returning to the method 200 of FIG. 3, step 215 shows that, in some embodiments, the described systems allow a merchant to post one or more markings relating to one or more of the merchant's locations. In this regard, the marking may serve any suitable purpose, including, without limitation, providing a means for users/customers to download all or a portion of the described software (e.g., the mobile app) to their mobile devices (e.g., where the devices do not already have such software or the most-recent version of such software) and/or to subscribe to one or more merchant locations (as discussed above).

Where the merchant chooses to post markings relating to one or more merchant locations, the merchant can post any suitable marking that allows users/customers to receive the described software and/or to subscribe to one or more merchant locations. Some examples of such suitable markings include, but are not limited to, one or more QR codes, barcodes, text numbers, URLs, and/or any other suitable markings. In some embodiments, however, the described systems generate a QR code for each merchant, each individual merchant location, and/or a collection of merchant locations. For example, FIGS. 4D and 4E show that, in some embodiments, the described systems generate a unique QR code 360 for each merchant location. Moreover, FIG. 4E shows that the merchant can download, print, and/or otherwise receive individual merchant codes 365 and place such codes in any and all suitable locations and/or media channels, including, without limitation, on table tents, posters, websites, menus, television commercials, radio advertisements, narrowband advertisements, magazines, newspapers, directories, phonebooks, Internet advertisements, e-mails, coupons, text messages, etc. Accordingly, in some embodiments, if a user/customer sees such a code, the user can scan the code (e.g., with a mobile device, with the described software, and/or otherwise) to receive the described software and/or subscribe to a particular merchant location.

Figure 4G:
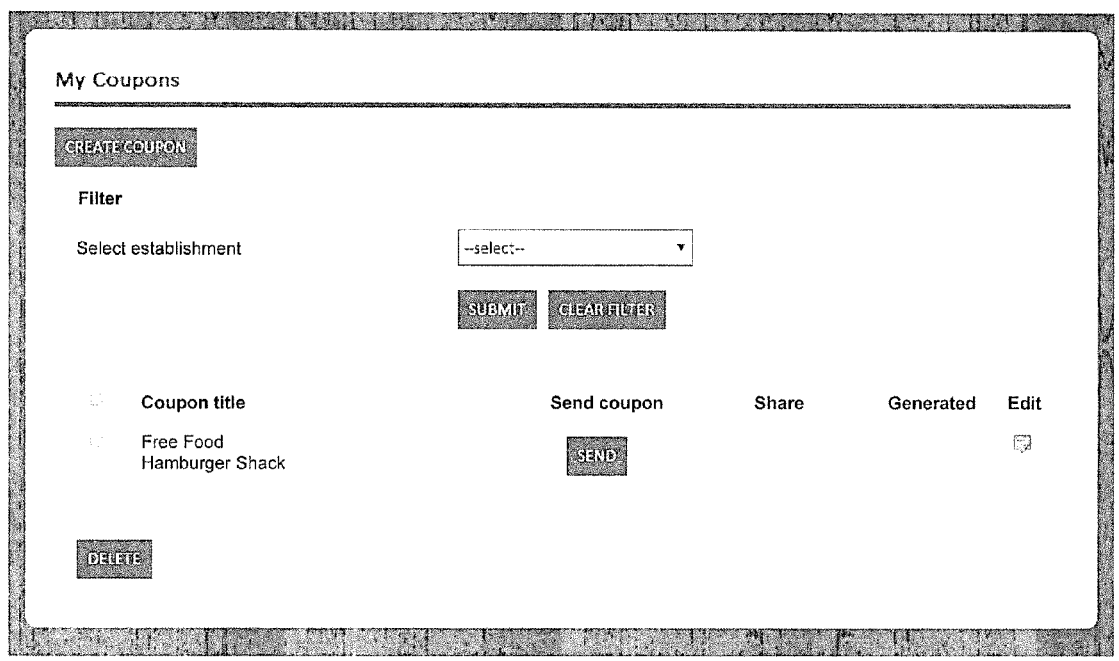

Returning again to FIG. 3, Set 220 shows that, in some embodiments, merchants are able to create one or more promotions. While the promotions can comprise any suitable format of media, including, without limitation, one or more: characters of text, images, video clips, audio clips, HTML, animations, and/or any other suitable form of media), FIGS. 4F and 4G show that, in some embodiments, the promotions (or coupons) comprise text. In particular, FIG. 4F shows that a merchant can type in a title of the promotions, text of the promotion, terms and conditions regarding the use of the promotion, and/or any other suitable information. Additionally, while the textual information can be any suitable length, in some embodiments, the text is limited to a maximum of 300 characters (e.g., 300 characters or less, 200 characters or less, etc.). Indeed, in some embodiments, the textual information is limited to a maximum of 140 characters.

In addition to textual information (and/or any other suitable media), the promotions can include any other information and can be modified in any suitable manner. By way of non-limiting example, FIG. 4F shows that in some embodiments, a merchant can select to which, of all of the merchant's locations, the promotion will apply. Additionally, FIG. 4F shows that, in some embodiments, the merchant can select how many people can redeem a promotion. For instance FIG. 4F shows that in some cases, a merchant can indicate that only the first 10 customers can take advantage of the promotion.

Returning again to FIG. 3, step 225 shows that, in some embodiments, the described method 200 continues as a merchant optionally sends a promotion to one or more customers. While the merchant can determine which customers will receive the promotion in any suitable manner, in some embodiments, the described systems and methods allow a merchant to define a radius and/or other promotion area around (or in some other suitable relation to) one or more specific merchant locations. In this regard, the promotion area can be any suitable shape (e.g., circular, square, rectangular, elliptical, triangular, polygonal, irregular, symmetrical, asymmetrical, and/or any other suitable shape) and can have any suitable physical relation (e.g., be centered on, boarder, comprise, and/or have any other suitable relationship) to a specific merchant location. By way of non-limiting illustration, FIGS. 4H-4J show that, in some embodiments, the promotion area 370 comprises a circle that is centered around a merchant location 375.

In some embodiments, the described systems are configured to indicate how many customers are in a particular promotion area 370. In this regard, the described systems can provide such an indication in any suitable manner, including, without limitation, by displaying a number of customers, by showing the location of each customer, by showing customers that are subscribed to a particular merchant/merchant location, by showing customers that have the app but are not subscribed to a particular merchant/merchant location, and/or by otherwise indicating how many customers are in a promotion area, at any given time (e.g., in near real-time and/or as the locations of the customers update). By way of non-limiting illustration, FIGS. 4H-4J show that, in some embodiments, the described systems are configured to show a marker 380 for each customer, showing that customer's physical location (or the physical location of such customer's mobile device) in relation to the promotion area 370. Additionally, FIGS. 4H-4J show that, in some embodiments, the described systems are configured to indicate which customers are subscribed to a particular merchant and/or merchant location (as indicated by the customer markings 385 with the lighter shading) and which customers are not subscribed to the merchant and/or one or more particular merchant locations (as indicated by the customer markings 390 with the darker shading).

Figure 4H:
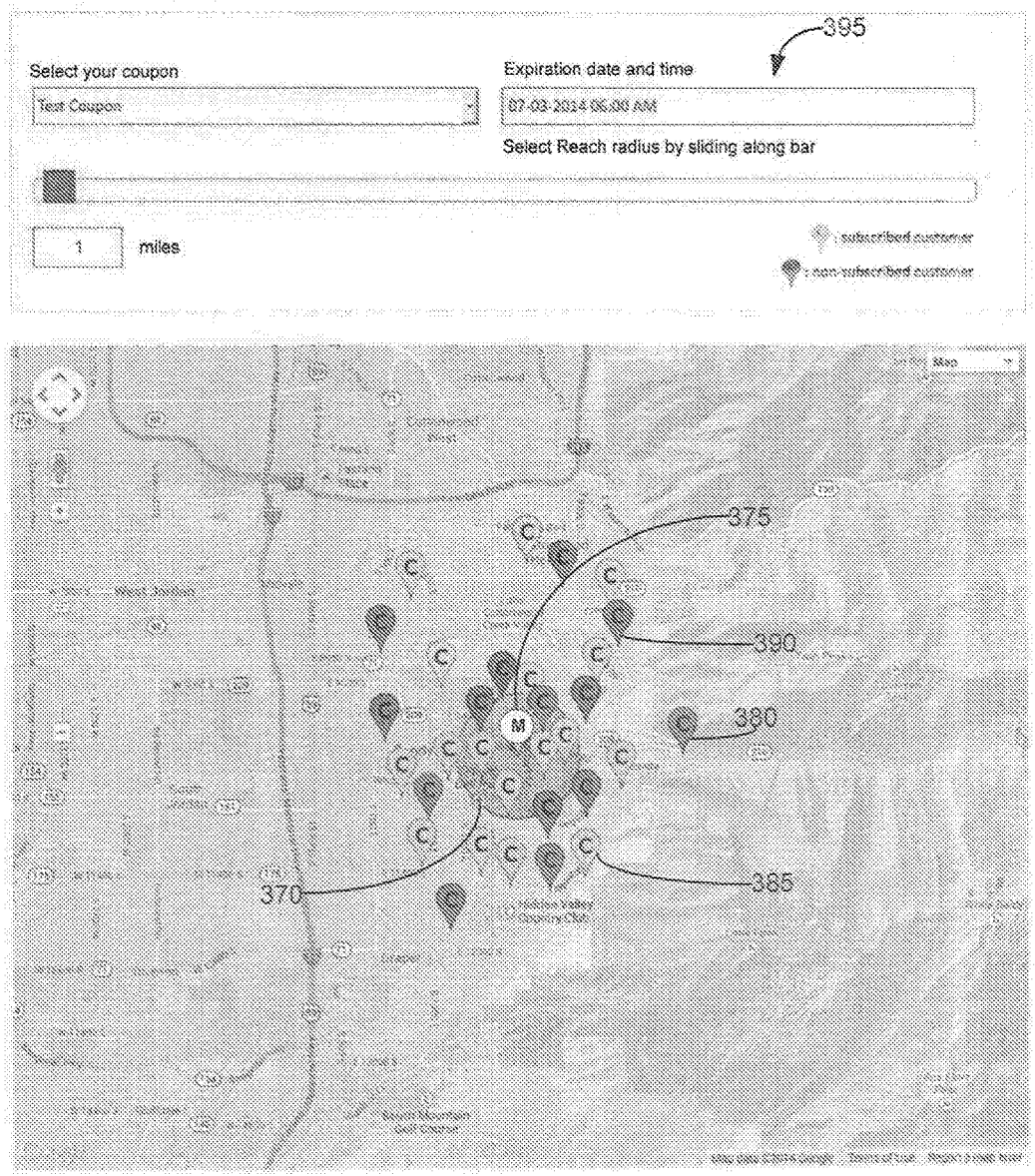
Figure 4I:
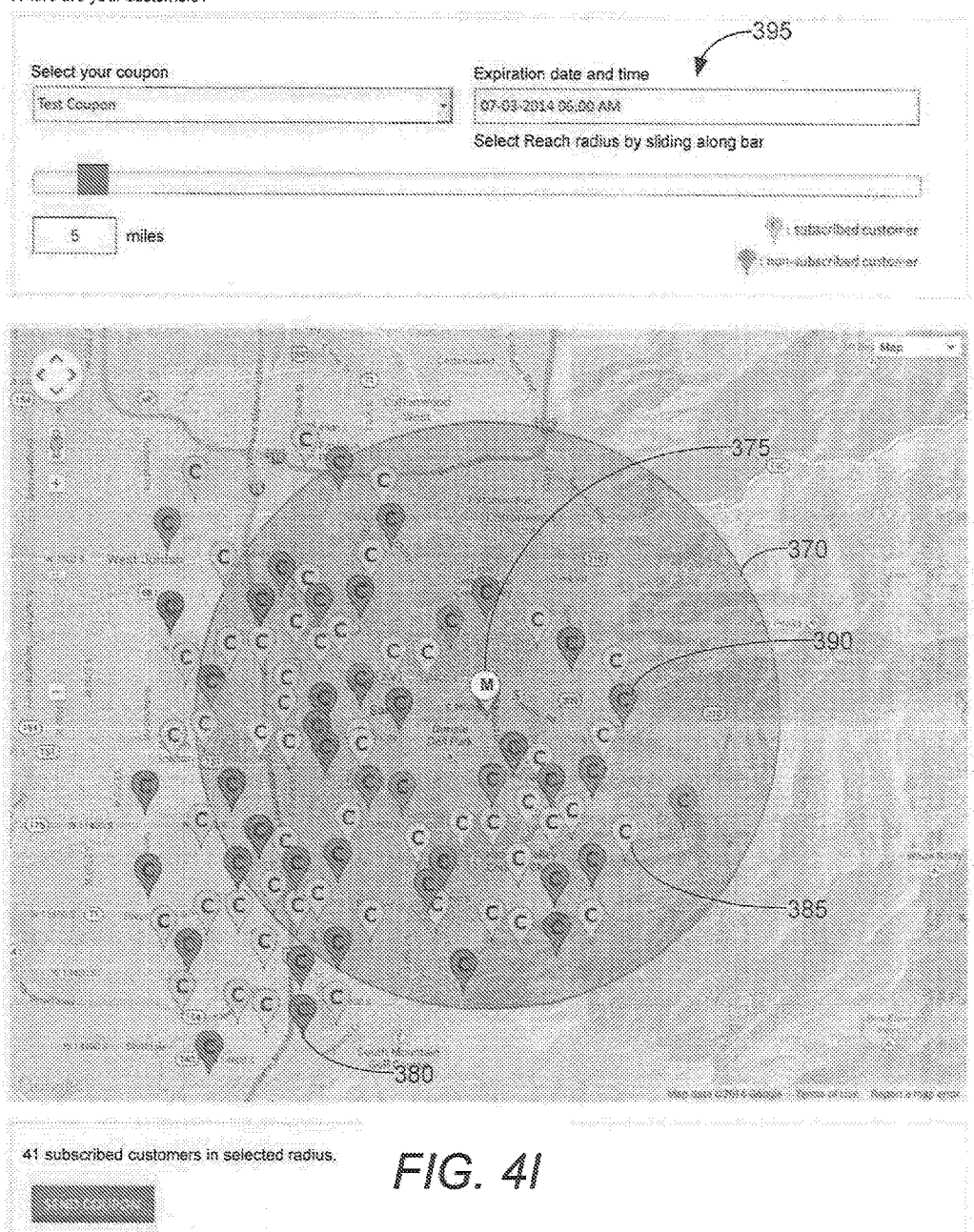
Figure 4J:
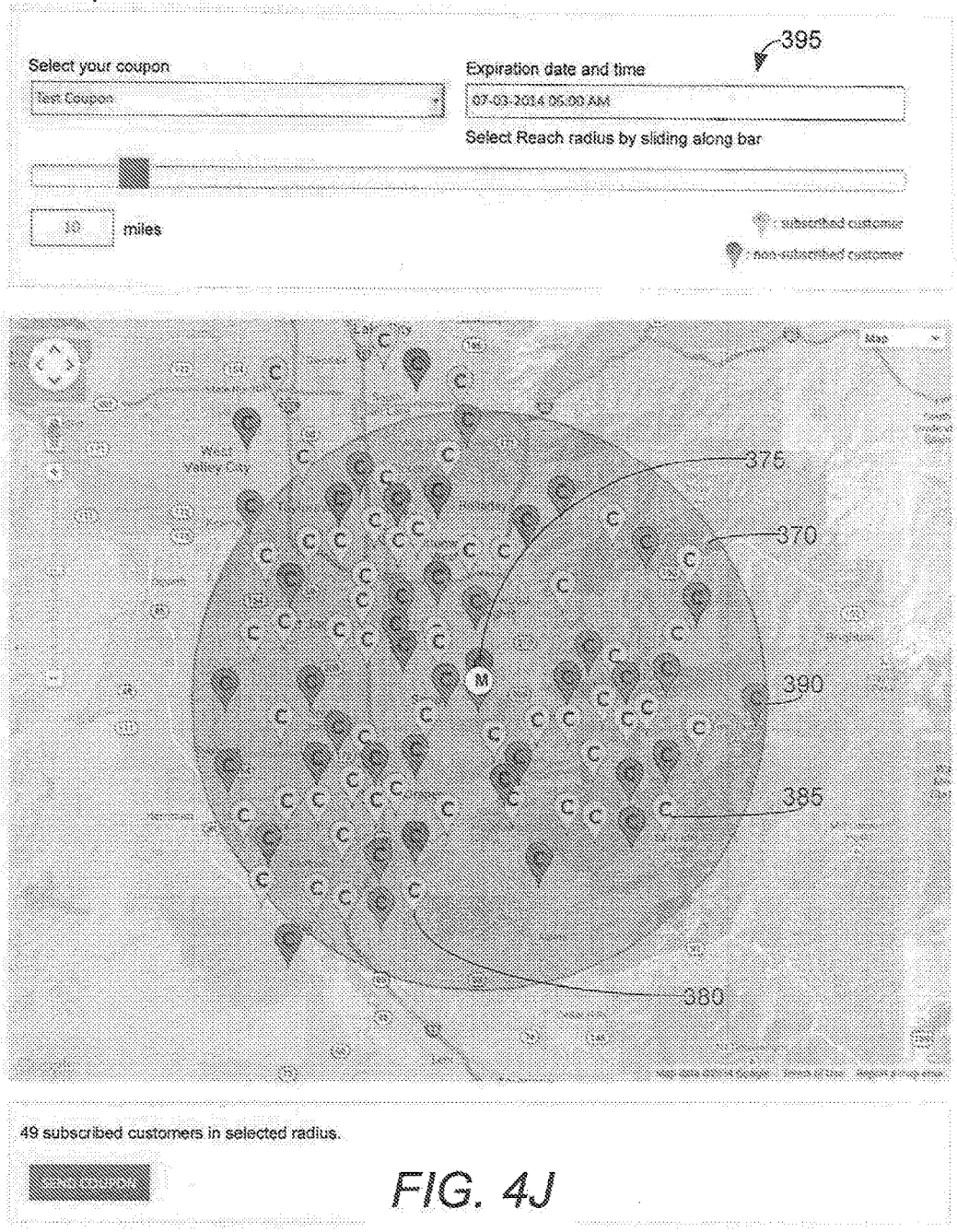

In some cases, the described systems are further configured (e.g., as shown in FIGS. 4H-4J) to allow a merchant to resize a particular promotion area 370. In this regard, the described systems can function as a proverbial "fish finder", showing a merchant where customers are, and allowing the merchant to know how far to cast the promotional "net." In other words, in some embodiments in which promotions are only sent to customers in (and/or that enter into) the promotion area, the described systems allow merchants to resize the promotion area to attempt to increase and/or decrease the number of customers that will receive any given promotion.

In some instances, the described systems also allow merchants to place effective periods on individual promotions, indicating that such promotions will only be valid during a set period of time. In this manner, a merchant can help encourage customers to act relatively quickly on a promotion. In this regards, the effective period may be set in any suitable manner, including, without limitation, by being directly or indirectly linked to the size of the promotion area (e.g., by increasing and decreasing in proportion to, and/or in accordance with, an increase and decrease, respectively, of the promotion area), by being directly or indirectly linked to a distance from the merchant/merchant location, and/or by being set by a merchant. By way of non-limiting illustration, FIGS. 4H-4J show some embodiments, in which merchants can set a specific time period 395 at which a particular promotion will expire.

As indicated earlier, in some embodiments, the described systems are configured to allow merchants to send promotions to customers that are in the promotion area at the time the promotion is sent. In some such embodiments, the systems are further configured to automatically send applicable promotions to customers as (and/or after) they (e.g., their mobile devices with the described software/app) enter the promotion area during the effective period of such promotions. As a result, such customers can receive timely promotions that are based (at least in part) on the customer's geographic location.

Once a merchant has prepared a promotion and the size of the promotion area is set, the merchant can send the promotion to customers in (or who enter into) the promotion area. In this regard, the promotion can be sent in any suitable manner, including, without limitation, as a text (e.g., via SMS and/or any other suitable format), as an in-app push notification (e.g., as shown in FIG. 2I), as a post on a social media site, as a post on another website (e.g., http://www-.miobileadreach.com), in an e-mail, a calendar notification (e.g., via GOOGLE® calendars, Microsoft Outlook, and/or otherwise), and/or in any other suitable manner. In some embodiments, however, the promotions are sent in via default methods, via the methods permitted by the customers' computer devices, and/or via the delivery methods selected by the individual customers. For example, in some implementations in which a customer is accessing promotions through a smartphone, the customer can access such promotions via e-mail, an in-app notification, a social network site, a text message, a website, and/or in any other suitable manner. In another example, where a customer is accessing a promotion through a tablet, the customer can access such promotion via e-mail, an in-app notification, a website, a social media page, and/or in any other suitable manner. In still another example, where a customer is accessing a promotion through a desktop and/or a laptop computer, the customer can access the promotion via an e-mail, a social network site, via a website, and/or in any other suitable manner.

Returning again to FIG. 2 step 230 shows that, in some embodiments, the described systems compare the locations of customers with the relevant merchant locations. In so doing, the described systems determine when a customer (e.g., a customer carrying a mobile device with the described software/app) enters (or comes with a set distance from) a merchant location. In some embodiments, when (as shown at step 235) a customer enters or comes within a set distance from a merchant location (e.g., with a mobile device having the described software/app), the described systems count such action as a conversion on a promotion.

While some embodiments of the described systems are configured to log a conversion any time a customer enters (or comes within a set distance from) a merchant location (e.g., with a mobile device with the described software/app), in other embodiments, the described systems only log a conversion when a customer enters (or comes within a set distance from) a merchant location during an effective period of an applicable promotion. Additionally, while some embodiments of the described systems are only configured to count a visit from a customer who is subscribed to a particular merchant/merchant location, in other embodiments, the described systems log a conversion from any customer (e.g., with a mobile device with the described app) that enters or comes within a set distance from the merchant location, whether or not such customer is subscribed to that particular merchant and/or merchant location. Similarly, while some embodiments of the described systems only log a conversion when a customer who actually received a promotion enters or comes within a set distance from a merchant location, in other embodiments, the described systems are configured to log a conversion when a customer enters into (or comes within a set proximity from) a specific merchant location (e.g., with a mobile device with the described app), whether or not such customer actually received a promotion.

With continued reference to FIG. 3, step 240 shows that, in some embodiments, the merchants are able to receive or otherwise access reports on one or more promotions. While such reports can include any suitable types of information for one or more promotions (e.g., the number of customers that received one or more particular promotions, the number of conversions during the effective period of one or more promotions, the time between when the promotion was sent and when the conversions took place, the number of first time and/or repeat visits from one or more customers to the merchant location, the locations from which the customers came to effectuate the conversions, etc.), FIG. 4K shows that, in accordance with some embodiments, a merchant is able to review the number of promotions received by customers for any individual (or group of) promotions and the number of walk-ins (conversions) occurring from such promotions during applicable effective periods.

Although some embodiments of the described systems and methods are configured to be provided to customers and/or merchants without any direct charge (e.g., are provided for free, with advertising, etc.) to such customers and/or merchants, in some other embodiments, the customers and/or the merchants have to pay to use the described systems and methods. Where customers and/or merchants pay to use the described systems and methods, the payments can be based on any suitable payment model, including, without limitation, a subscription-based model, a pay-per-use model, a pay-per promotion model, a pay-per location model, a pay for ad placement model, and/or in any other suitable manner).

In some embodiments, customers are allowed to receive and/or otherwise access promotions for free, while the merchants are charged for use of the described systems and methods. In other embodiments merchants are charged fees that are based (at least somewhat) on the number of conversions such merchants receive on their promotions. In still other embodiments, merchants are charged based (at least somewhat) on the number of promotions they receive. For instance, in some embodiments, a merchant is given the ability to send a certain number of promotions each day (and/or during another set time period) to a limited (or when otherwise determined, an unlimited) number of customers each day, for free or for a set fee. In some such instances, however, the merchant will have to pay a fee if it would like to send out more promotions that day (or in the set time period). Additionally, in some such embodiments, the merchant will be deducted (or otherwise charged) credits, points, tokens, cash, and/or some other value for the conversions it receives. In this regard, FIG. 4L shows that, in some embodiments, a merchant can purchase additional "points" to prepay for additional conversions. Additionally, in some embodiments, when a merchant's balance (e.g., of cash, points, and/or other value) approaches or reaches zero (and/or some other set threshold) and time still remains in the effective period of a promotion, the described systems and methods will automatically charge the merchant a set amount to cover potential promotion redemptions.

In still another example showing how merchants can be charged for use of the described systems and methods, merchants are charged different fees (and/or deducted credits or other value) based on a classification given to the individual merchants. In this regard, merchants can be classified in any suitable manner, and be charged fees and/or have credits deducted in any suitable manner, based on such merchants' classifications. By way of non-limiting illustration, a bar may be deducted 2 points for each conversion, while a clothing store may be deducted 4 points for each conversion.

In another example, merchants are able to bid on the prices they will pay for each conversion that is registered at the merchants' various locations. While this bidding process can function in any suitable manner, in some embodiments (e.g., in concentrated merchant areas), the described systems and methods include the running analytics that allow merchants to bid on the price they pay for registered conversions. In some such embodiments, the minimum bidding prices, the promotion delivery methods, and/or the frequency with which promotions are sent to customers are automatically adjusted based on the time of day (e.g., whether or not it is a highly valued time period, such as lunch or dinner time for restaurants, happy hour for bars, etc.), the size of the promotion area, the number of merchants vying for promotions, the number of customers in the promotion area, and/or any other suitable criteria.

In still another example, merchants are able to pay a set fee for a certain number of conversions, being charged an additional fee for additional conversions. In this example, a merchant may provide a promotion (e.g., relating to a yard sale, church function, concert, charity event, race, fair, etc.) on a coupons page of the described app and/or in any other suitable manner. In some such embodiments, a customer would have to subscribe to the merchant to obtain the address of the merchant's location. Additionally, in some such embodiments, once the promoted event has been completed (e.g., the promotion's effective period has lapsed and/or the event has finished), the merchant is removed from the merchant list and the merchant's account is placed on hibernation, ready to become activated the next time the merchant chooses to provide a promotion.

In yet another example, customers pay to use the described systems and methods. While customers can pay in any suitable manner, in some embodiments, they pay: per promotion they use, a subscription free, by clicking on advertisements associated with the described systems, and/or in any other suitable manner.

In addition to the aforementioned features, the described systems and methods can be modified in any suitable manner and can have any other suitable aspect and/or beneficial characteristic. Indeed, in some embodiments, the described systems allow merchants to target customers that are most-likely to respond to a promotion (e.g., customers that are in an optimal actionable location). In some embodiments, the described systems and methods allow merchants (and not a third party) to directly control who receives promotions and when promotions are sent. In this regard, in some embodiments, the described systems and methods allow merchants to create and send promotions "on the fly," thus allowing merchants to send promotions at slow times and as the merchants otherwise desire.

In some embodiments, the described methods also allow merchants to target customers based on the customers geographic location and not necessarily on other information that can be difficult to gather (correctly) (e.g., a customer's age, gender, shopping habits, etc.). In some embodiments, the described systems and methods allow customers to search for merchants and promotions based on a variety of factors, including, without limitation, proximity to the customers, establishment type, hours of operation, consumer reviews, etc. In some embodiments, the described systems and methods also allow merchants to receive reports on various promotions to show what works and what does not (e.g., what key words, promotion area sizes, effective periods, etc. result or do not result in conversions). Additionally, in some embodiments, merchants do not have to pay for promotions or the number of people that receive promotions, but only for the actual number of conversions on the promotions.

In still other embodiments, the described systems and methods are capable of tracking, and/or allowing a merchant to track, a customer while having little to no impact on the customer's operating experience on the customer's mobile device. Indeed, while in some embodiments, the described systems and methods track the location of a customer's mobile device while the described app is opened and running in the foreground on the customer's device, in some other embodiments, the described systems and methods are configured to track a customer's location, even when the app is not running on the customer's mobile device. While this can be accomplished in any suitable manner, in some embodiments, the described systems and methods track a customer's device when the described app is running in the background on such device. In other embodiments, the described app is closed on a customer's device until the device crosses a geographic boundary (e.g., into the promotion area), at which point the app is re-launched (e.g., into the background and/or otherwise) on the customer's mobile device. In another example, if the described app is suspended when an event occurs (e.g., a customer passes into a promotion area, a merchant is pinging or otherwise searching for customers, and/or any other suitable event), the app is "woken up" and given time to handle the event (e.g., report its position and/or otherwise handle the event) before going back into suspension.

In yet other embodiments, some implementations of the described systems are able to be incorporated and/or otherwise used with any other suitable systems and/or methods. Indeed, in one example, the described systems allow one or more promotions to be placed in a merchant's information on a GOOGLE® Places page addressing such merchant. In some such implementations, a link that allows customers to download the described mobile app from the Places page is also available with such promotion. Moreover, in some such implementations, when a merchant updates its profile information in GOOGLE Places (and/or any other suitable forum) such merchant's profile is automatically updated in the described mobile app, in a website supporting the described systems (e.g., www.mobileadreach.com), and/or in any other suitable location (and vice versa).

In still other implementations, the described systems communicate with (and/or otherwise use) an application profile interface that allows information (e.g., menus, store hours, product and service lists, customer reviews, and/or any other suitable information) to automatically be uploaded to update (and populate) the described systems and methods (e.g., to update merchant information in the mobile app and/or elsewhere).

In even other embodiments, the described systems and methods are used in connection with one or more websites and/or software applications (e.g., PANDORA®, SOUNDCLOUD®, and/or any other suitable software) that is capable of audibly (e.g., vocally or otherwise) broadcasting (and/or narrowcasting) a promotion upon delivery to a customer. Indeed, in some embodiments, the described systems and methods are configured to verbally announce a coupon to a customer when the promotion is received (and/or at any other suitable time).

In still other embodiments, the described systems and methods are also configured such that some of a customer's information is shared with one or more third parties. While the described systems and methods can share any suitable information about a customer with any suitable third party, in some cases, when a customer indicates that he or she would like to visit a merchant's location, the described app provides the customer's pick up coordinates, destination coordinates, and/or other information to a car service (e.g., a taxi service, UBER, etc.). Similarly, in some embodiments, the described app provides a customer with a link one or more third-party services (e.g., a transportation service)—thus enabling the customer to have a rich user experience and/or to more readily take advantage of a promotion.

In still other embodiments, the described systems and methods are configured to be used with and/or to function as a digital payment platform that allows customers and/or merchants to use to the application to pay for products and/or services.

In yet other embodiments, the described systems and methods are able to be used as an affiliate and referral program for sales reps and for third party marketing.

In even other embodiments, some implementations of the described systems and methods allow a customer to receive promotions from one or more merchants (e.g., merchants of the customer's choice), even when the customer is not located within a promotion area. Indeed, in some such embodiments, a customer is able to choose (e.g., via a feature in the mobile app and/or otherwise) to receive some or all promotions from a merchant, no matter where the customer is at the time a promotion for a corresponding merchant is sent.

Representative Embodiment of an Operating Environment

The described systems and methods can be used with or in any suitable operating environment and/or software. In this regard, FIG. 5 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand-alone electronic devices, and other such electronic environments.

Some embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

Figure 5:
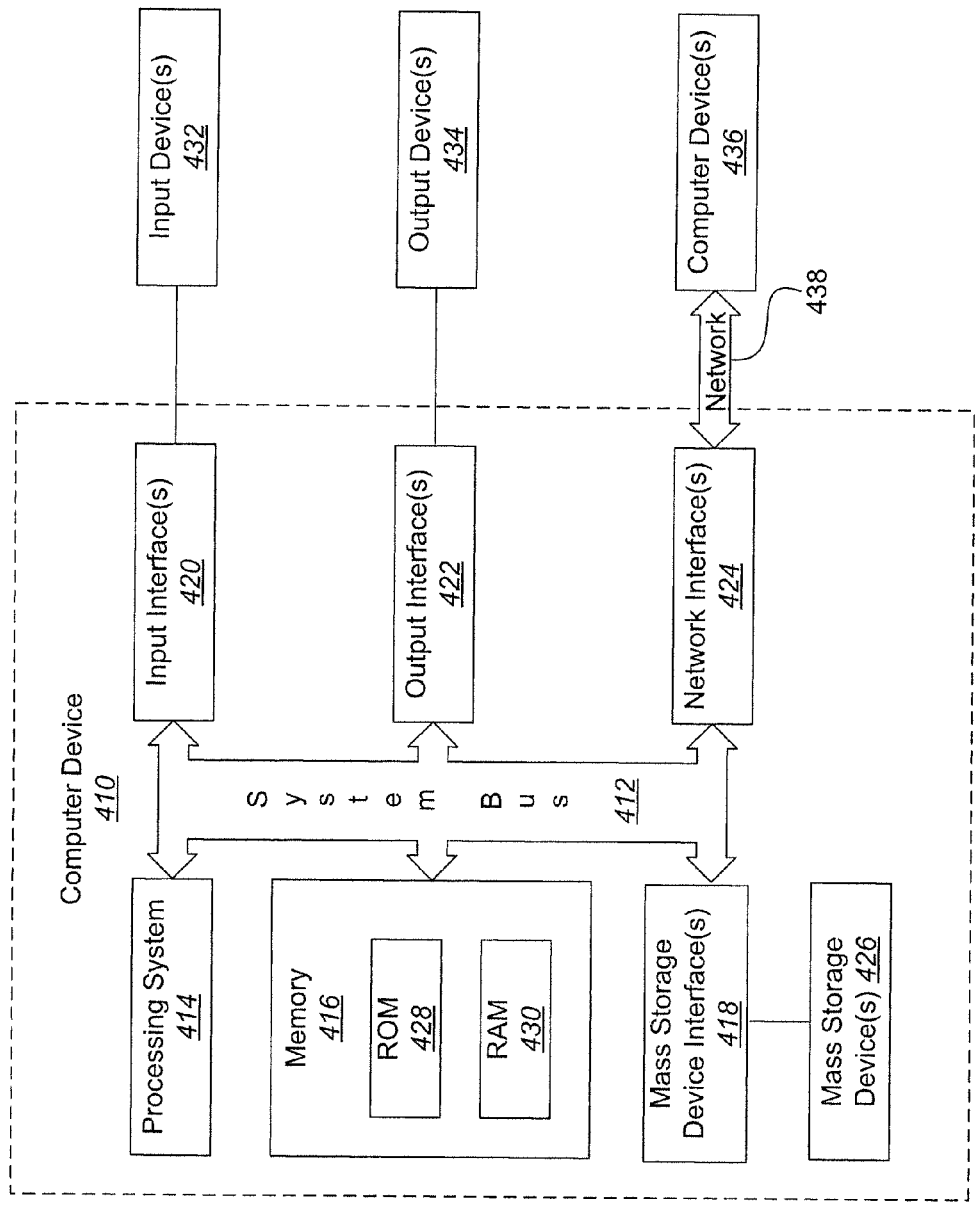
FIG. 5 depicts a representative system that provides a suitable environment for some embodiments of the described systems and methods.

With reference to FIG. 5, a representative system for implementing embodiments of the invention includes computer device 410, which may be a general-purpose or special-purpose computer or any of a variety of consumer electronic devices. For example, computer device 410 may be a smart phone, feature phone, handheld device, personal computer, a notebook computer, a netbook, a tablet computer such as the iPad® manufactured by Apple or any of a variety of ANDROID™-based, AMAZON®-based, BLACKBERRY®-based, WINDOWS®-based, and/or similar tablet (and/or other handheld) computers produced by multiple manufacturers, a personal digital assistant ("PDA") or other hand-held device, a workstation, a mini-computer, a mainframe, a supercomputer, a multi-processor system, a network computer, a processor-based consumer electronic device, or the like, running with any suitable operating system (including, without limitation, iOS, Android, Windows, Linux, UNIX, Chromium OS, OS X, BSD, QNX, IBM z/OS, and/or any other suitable known and/or novel operating system).

Computer device 410 includes system bus 412, which may be configured to connect various components thereof and enables data to be exchanged between two or more components. System bus 412 may include one of a variety of bus structures including a memory bus or memory controller, a peripheral bus, or a local bus that uses any of a variety of bus architectures. Typical components connected by system bus 412 include processing system 414 and memory 416. Other components may include one or more mass storage device interfaces 418, input interfaces 420, output interfaces 422, and/or network interfaces 424, each of which will be discussed below.

Processing system 414 includes one or more processors, such as a central processor and optionally one or more other processors designed to perform a particular function or task. It is typically processing system 414 that executes the instructions provided on computer-readable media, such as on memory 416, a solid-state drive, a flash drive, a magnetic hard disk, a removable magnetic disk, a magnetic cassette, an optical disk, or from a communication connection, which may also be viewed as a computer-readable medium.

Memory 416 includes one or more computer-readable media that may be configured to include or includes thereon data or instructions for manipulating data, and may be accessed by processing system 414 through system bus 412. Memory 416 may include, for example, ROM 428, used to permanently store information, and/or RAM 430, used to temporarily store information. ROM 428 may include a basic input/output system ("BIOS") having one or more routines that are used to establish communication, such as during start-up of computer device 410. RAM 430 may include one or more program modules, such as one or more operating systems, application programs, and/or program data.

One or more mass storage device interfaces 418 may be used to connect one or more mass storage devices 426 to system bus 412. The mass storage devices 426 may be incorporated into or may be peripheral to computer device 410 and allow computer device 410 to retain large amounts of data. Optionally, one or more of the mass storage devices 426 may be removable from computer device 410. Examples of mass storage devices include solid-state drives, flash drives, hard disk drives, magnetic disk drives, tape drives and optical disk drives. A mass storage device 426 may read from and/or write to a magnetic hard disk, a removable magnetic disk, a magnetic cassette, an optical disk, or another computer-readable medium. Mass storage devices 426 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 420 may be employed to enable a user to enter data and/or instructions to computer device 410 through one or more corresponding input devices 432. Examples of such input devices include a keyboard and alternate input devices, such as a mouse, trackball, touch screen, light pen, stylus, or other pointing device, a microphone, a joystick, a game pad, a satellite dish, a scanner, a camcorder, a digital camera, and the like. Similarly, examples of input interfaces 420 that may be used to connect the input devices 432 to the system bus 412 include a serial port, a parallel port, a game port, a universal serial bus ("USB"), an integrated circuit, a FIREWIRE® (IEEE 1394), lightning port, HDMI, or another interface. For example, in some embodiments input interface 420 includes an application specific integrated circuit (ASIC) that is designed for a particular application. In a further embodiment, the ASIC is embedded and connects existing circuit building blocks.

One or more output interfaces 422 may be employed to connect one or more corresponding output devices 434 to system bus 412. Examples of output devices include a monitor or display screen or other electronic display, a speaker, a printer, a multi-functional peripheral, and the like. A particular output device 434 may be integrated with or peripheral to computer device 410. Examples of output interfaces include a video adapter, an audio adapter, a parallel port, and the like. Examples of electronic displays include monitors, televisions, e-ink displays, projection displays, or any other display capable of displaying changing information under the control of a computer device.

One or more network interfaces 424 enable computer device 410 to exchange information with one or more other local or remote computer devices, illustrated as computer devices 436, via a network 438 that may include hardwired and/or wireless links. Examples of network interfaces include a network adapter for connection to a local area network ("LAN") or a modem, wireless link, or other adapter for connection to a wide area network ("WAN"), such as the Internet. The network interface 424 may be incorporated with or peripheral to computer device 410. In a networked system, accessible program modules or portions thereof may be stored in a remote memory storage device. Furthermore, in a networked system computer device 410 may participate in a distributed computing environment, such as a cloud-based computer environment, where functions or tasks are performed by a plurality of networked computer devices.

Figure 6:
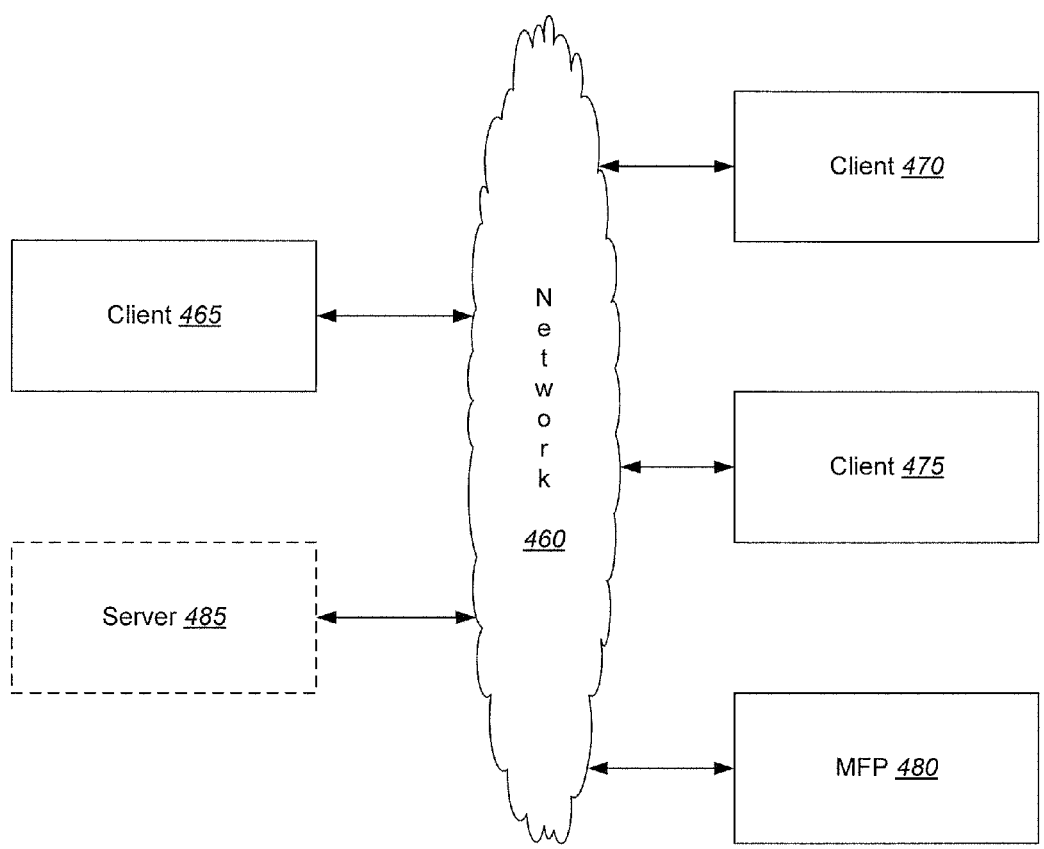
FIG. 6 illustrates a representative networked system that provides a suitable environment for some embodiments of the described systems and methods.

Thus, while those skilled in the art will appreciate that embodiments of the present invention may be practiced in a variety of different environments with many types of system configurations, FIG. 6 provides a representative networked system configuration that may be used in association with embodiments of the present invention. The representative system of FIG. 6 includes a computer device, illustrated as client 465, which is connected to one or more other computer devices (illustrated as client 470 and client 475) and one or more peripheral devices (illustrated as multifunctional peripheral (MFP) MFP 480) across network 460. While FIG. 6 illustrates an embodiment that includes a client 465, two additional clients, client 470 and client 475, one peripheral device, MFP 480, and optionally a server 485, which may be a print server, connected to network 460, alternative embodiments include more or fewer clients, more than one peripheral device, no peripheral devices, no server 485, and/or more than one server 485 connected to network 460. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 6, the client 465 may be a computer device having a limited set of hardware and/or software resources. Because the client 465 is connected to the network 460, it may be able to access hardware and/or software resources provided across the network 460 by other computer devices and resources, such as client 470, client 475, server 485, or any other resources. The client 465 may access these resources through an access program, such as a web browser, and the results of any computer functions or resources may be delivered through the access program to the user of the client 465. In such configurations, the client 465 may be any type of computer device or electronic device discussed above or known to the world of cloud computing (e.g., a platform-as-a-service, a software-as-a-service technique, an application programming interface, and/or otherwise), including traditional desktop and laptop computers, smart phones, and other smart devices, tablet computers, or any other device able to provide access to remote computing resources through an access program, such as a browser. Accordingly, in some embodiments, the described systems and methods can allow many customers, merchants, etc. to receive, access, and/or send promotions (and otherwise take advantage of the described systems and methods) from many places throughout the world.

Thus, as discussed herein, the embodiments of the present invention embrace systems and methods for advertising. In particular, some implementations of the present invention relate to systems and methods for using one or more mobile devices to provide promotional materials to one or more customers, based (at least partially) on the geographic location of such mobile devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for remotely providing an electronic merchant promotion to a customer computing device, the method comprising the steps of:
   receiving, by a server, a request to subscribe to a merchant or a merchant category from a customer through a transportable device executing an application;
   collecting, by the server, geographic coordinates of the transportable device associated with the customer provided from a location positioning system;
   tracking, by the server, location of the customer associated with the transportable device through geographic coordinate associated with the transportable device;
   generating, by the server, a promotion or advertisement associated with the merchant;
   receiving, by the server, a merchant-based promotion or advertisement area or radius from a merchant computer associated with the merchant;
   identifying, by the server, a number of customers each having a transportable device located within the merchant-based area or radius who are subscribed to the merchant or merchant category;
   transmitting, by the server, the number of customers each having a transportable device located within the merchant based area or radius to be displayed on the merchant computer;
   receiving, by the server, an effective duration of the promotion or advertisement for customers within the merchant-based area or radius;
   transmitting, by the server, the promotion or advertisement to the number of customers each having a transportable device within the merchant-based area or radius during the effective duration of the promotion or advertisement;
   comparing, by the server, a merchant location within the merchant-based area or radius associated with the merchant to the location of the number of customers;
   logging, by the server, a conversion of one or more customers of the merchant when the transportable device associated with the customer is within a predetermined distance of the merchant location during the effective duration of the promotion; and
   transmitting, by the server, a report to the merchant based on performance of the promotion or advertisement.

2. The method of claim 1, further comprising deducting value from a merchant account for each logged conversion.

3. The method of claim 1, wherein the predetermined distance is a first distance.

4. The method of claim 1, wherein the predetermined distance is a second distance.

5. The method of claim 1, wherein the promotion is only broadcast to the transportable device of the subscribed customers when the subscribed customer enters into the promotion area or radius.

6. The method of claim 1 wherein the conversion can only occur during the effective duration of the promotion.

7. The method of claim 1 further comprising indicating on the merchant's computing device near real-time location of each transportable device of the subscribed customer and showing a map of the transportable devices of the subscribed customers in the promotion area or radius on the merchant's computing device.

8. The method of claim 1 further comprising indicating on the merchant's computing device near real-time location of each transportable device of the subscribed customer and listing the distance of each transportable device of the subscribed customers in the promotion area or radius from the merchant's physical location.

9. The method of claim 1 further comprising indicating on the merchant's computing device near real-time location of each transportable devices of the subscribed customers and listing the number of transportable devices of the subscribed customers within the promotion area or radius.

10. The method of claim 1 wherein a size of merchant-based promotion or advertisement area or radius can be increased or decreased by input by the merchant on the merchant's computing device.

\* \* \* \* \*